United States Patent
Ueki et al.

(10) Patent No.: US 8,166,999 B2
(45) Date of Patent: May 1, 2012

(54) GAS BLOCK DEVICE AND GAS BLOCK METHOD

(75) Inventors: Kouichi Ueki, Nara (JP); Shigetada Sazawa, Tokyo (JP); Kazutaka Hamada, Kyoto (JP); Mitsuo Namba, Tokyo (JP); Fujio Hori, Toyama (JP); Sadamu Kawashima, Shizuoka (JP); Isao Masuda, Shizuoka (JP); Hisanori Yamashita, Shizuoka (JP); Kazutaka Asano, Nara (JP)

(73) Assignee: Panasonic Corporation, Osaka (JP)

( * ) Notice: Subject to any disclaimer, the term of this patent is extended or adjusted under 35 U.S.C. 154(b) by 936 days.

(21) Appl. No.: 11/577,684

(22) PCT Filed: Oct. 20, 2005

(86) PCT No.: PCT/JP2005/019308
§ 371 (c)(1),
(2), (4) Date: Jan. 10, 2008

(87) PCT Pub. No.: WO2006/043630
PCT Pub. Date: Apr. 27, 2006

(65) Prior Publication Data
US 2008/0115840 A1    May 22, 2008

(30) Foreign Application Priority Data

Oct. 20, 2004  (JP) ............................ P.2004-305336
Oct. 20, 2004  (JP) ............................ P.2004-305337

(51) Int. Cl.
*F17D 5/06* (2006.01)
(52) U.S. Cl. ............ 137/487.5; 137/624.12; 137/624.15
(58) Field of Classification Search .............. 137/487.5, 137/624.11, 624.12, 624.13, 624.15
See application file for complete search history.

(56) References Cited

U.S. PATENT DOCUMENTS
4,866,633 A * 9/1989 Nakane et al. ................ 700/282
(Continued)

FOREIGN PATENT DOCUMENTS
JP      56-160520      12/1981
(Continued)

OTHER PUBLICATIONS

Microfilm of the specification and drawings annexed to the request of Japanese Utility Model Application No. 58076/1989 (Laind-open No. 5055/1991), Yazaki Corp., Jan. 18, 1991.
(Continued)

*Primary Examiner* — Craig Schneider
*Assistant Examiner* — William McCalister
(74) *Attorney, Agent, or Firm* — Pearne & Gordon LLP

(57) ABSTRACT

A use condition of gas equipment is monitored. An abnormality determination unit 26 determines whether or not a use flow volume obtained by detecting a flow velocity obtained by measuring a signal transfer time in a medium using a flow velocity detection unit 17 and converting the detected flow velocity into a flow volume using a flow volume calculation unit 25. When the shutoff unit 27 shuts off a fluid path 1 when it is determined that there is abnormality, a return signal is output from a return unit 28 to a shutoff unit 27 in order to use the gas again by opening the fluid path. Simultaneously, when a return time-counting unit 29 starts the time-counting operation, and then, a predetermined time period has been elapsed, the flow volume calculation unit 25 determines whether or not a predetermined flow volume of greater flows in order to identify whether or not all of the gas plugs of the gas equipment connected to the downstream of the gas shutoff apparatus 27 are closed. The leakage determination unit 30 determines that there is leakage when a predetermined flow volume or greater is detected, and a driving signal is output to the shutoff unit 27 to close the fluid path 1.

8 Claims, 9 Drawing Sheets

U.S. PATENT DOCUMENTS

| | | | | |
|---|---|---|---|---|
| 4,881,948 A * | 11/1989 | Nakane et al. | | 48/192 |
| 4,928,728 A * | 5/1990 | Nakane et al. | | 137/486 |
| 5,261,268 A | 11/1993 | Namba | | |
| 5,515,883 A * | 5/1996 | Bouzaglou | | 137/357 |
| 5,554,976 A * | 9/1996 | Miyauchi et al. | | 340/626 |
| 5,866,802 A | 2/1999 | Kimata et al. | | |
| 5,893,388 A * | 4/1999 | Luker | | 137/456 |
| 5,950,667 A * | 9/1999 | Nicewonger et al. | | 137/459 |
| 5,971,011 A * | 10/1999 | Price | | 137/460 |
| 5,979,493 A * | 11/1999 | Simpkins, Jr. | | 137/487.5 |
| 6,026,838 A * | 2/2000 | Nicewonger et al. | | 137/2 |
| 6,105,607 A * | 8/2000 | Caise et al. | | 137/487.5 |
| 6,119,720 A * | 9/2000 | Isaacson et al. | | 137/459 |
| 6,164,319 A * | 12/2000 | Cochran et al. | | 137/487.5 |
| 6,209,576 B1 * | 4/2001 | Davis | | 137/487.5 |
| 6,216,727 B1 * | 4/2001 | Genova et al. | | 137/487.5 |
| 6,237,618 B1 * | 5/2001 | Kushner | | 137/1 |
| 6,513,542 B1 * | 2/2003 | Hsieh | | 137/312 |
| 6,725,878 B1 * | 4/2004 | Nawa et al. | | 137/487.5 |
| 6,938,637 B2 * | 9/2005 | McGill et al. | | 137/39 |
| 7,114,516 B2 * | 10/2006 | Ito | | 137/487.5 |
| 7,306,008 B2 * | 12/2007 | Tornay | | 137/624.11 |
| 2010/0330515 A1 * | 12/2010 | Ueki et al. | | 431/22 |

FOREIGN PATENT DOCUMENTS

| | | | |
|---|---|---|---|
| JP | 63-203167 | | 8/1988 |
| JP | 03-005055 | | 1/1991 |
| JP | 7-239099 | | 9/1995 |
| JP | 07-239099 | * | 12/1995 |
| JP | 10-048020 | | 2/1998 |
| JP | 10-288337 | | 10/1998 |
| JP | 2001336740 A | * | 12/2001 |
| JP | 2001-336740 | | 4/2007 |

OTHER PUBLICATIONS

International Search Report (PCT/JP2005/019308) dated Jan. 24, 2006.

Japanese Office action with English translation, dated Mar. 31, 2008.

Supplementary Partial European Search Report for EP 05 79 5850 dated Apr. 5, 2011.

* cited by examiner

GAS BLOCK DEVICE AND GAS BLOCK METHOD

TECHNICAL FIELD

The present invention relates to a gas shutoff apparatus and a gas shutoff method for detecting flow rates of various medium including gases such as a city gas or an LP gas, flowing though a pipe, by using ultrasound and accurately measuring a medium use amount in order to monitor whether or not its use condition is safe.

BACKGROUND ART

FIG. 9 shows a conventional gas shutoff apparatus of the above type as disclosed in, for example, JP-A-56-160520.

Referring to FIG. 9, a reference numeral 1 denotes a pipe, in which a shutoff valve 3 for shutting off or passing use gases in the pipe is installed near a gas supply source 2. A reference numeral 4 denotes gas exhaust equipment such as a gas stove, in which an equipment plug 5 is installed. A reference numeral 6 denotes a main controller, which transmits a control signal to the shutoff valve. A reference numeral 7 denotes a pressure sensor unit, which is installed in downstream of the shutoff valve 3. A reference numeral 8 denotes an equipment plug open/close detection unit, which outputs an equipment plug open/close signal in association with open/close operations of the equipment plug 5. A reference numeral 9 denotes a use gas pressure monitoring circuit, and a reference numeral 10 denotes a residual gas pressure detection circuit. When the equipment plug open/close signal is output from the equipment plug open/close detection unit 8, and the gas pressure is detected by the pressure sensor unit 7, the detected gas pressure is output to the use gas pressure monitoring circuit 9 and the residual gas pressure detection circuit 10. A reference numeral 11 denotes a storing circuit, which stores the gas pressure signal from the use gas pressure detection circuit 9 and the residual gas pressure detection circuit 10. A reference signal 12 denotes a shutoff valve open/close circuit, which receives a reduction condition and outputs a blockage signal to the shutoff valve 14 when a pressure reduction signal is input from the use gas pressure detection circuit 9 and the residual gas pressure detection circuit 10 to the storing circuit 11. A reference numeral 13 denotes a return button, and a reference numeral 14 denotes a timer circuit. A reference numeral 15 denotes a safety return circuit, which transmits an output signal from the storing circuit 11 and the timer circuit 12 to the storing circuit 11, the timer circuit 12, and a lamp buzzer circuit 16 when the output signal from the storing circuit 11 and the timer circuit 12 is received, in order to retain a checking condition.

Subsequently, operations of the conventional example will be explained. When the equipment plug 5 of the gas combustion equipment 4 such as a gas stove is opened, an equipment plug open/close signal is output from the equipment plug open/close detection unit 8 to the use gas pressure monitoring circuit 9 and the residual gas pressure detection circuit 10. In addition, the gas pressure detection signal from the pressure detection unit 7 is input to the use gas pressure monitoring circuit 9 and the residual gas pressure detection circuit 10. The use gas pressure monitoring circuit 9 outputs the gas pressure detection signal and the equipment plug open/close signal, which have been input, to the storing circuit 11. When the equipment plug is opened on the basis of these signals, the gas is output to the shutoff valve open/close circuit 12. When the pressure is abruptly reduced below a predetermined value in the case of hose disconnection or the like, the output stops. The input signals such as the equipment plug open/close signal and the gas pressure detection signal to the residual gas pressure detection circuit 10 are output to storing circuit 11 in order to detect an abnormal condition. On the other hand, the output signal from the equipment plug open/close unit 8 is output to each circuit, and the residual gas detection circuit 10 is set when the equipment plug 5 is closed. The residual gas pressure detection circuit 10 starts to detect the residual gas pressure when the equipment plug 5 is closed. When the gas pressure is reduced below a certain value, the storing circuit 11 and the safety return circuit 15 transmits signals to the shutoff valve open/close circuit 12 and the timer circuit 14 to start the timer as well as set the shutoff valve 3 to an open state. Then, it is monitored again whether or not the residual gas pressure is reduced below a certain value within a certain time limit (e.g., within five to fifteen minutes) set by the timer circuit 14. When the gas pressure is reduced below a certain value, a signal is transmitted to the storing circuit 11 and the shutoff valve 3 is locked through the shutoff valve open/close circuit 12. When the gas pressure is not reduced, the storing circuit 11 is reset. The storing circuit 11 stores a gas pressure reduction signal from the use gas pressure monitoring circuit 9 or the residual gas pressure detection circuit 10, and outputs it to the shutoff valve open/close circuit 12 to close the shutoff valve 3. Simultaneously, the signal from the use gas pressure monitoring circuit 9 is output to the lamp buzzer circuit 16 through the timer circuit 14 and the safety return circuit 15 in order to operate a buzzer or an alarming lamp. The shutoff valve open/close circuit 12 receives a signal from the storing circuit 11, which has received the signal from the residual gas pressure detection circuit 10, to stop electric transmission to the shutoff valve 3 in the case of an abnormal signal. The timer circuit 14 is operated on the basis of operation of the storing circuit 11, the safety return circuit 15, or the return button 13, and transmits its output to the lamp buzzer circuit 16 and the safety return circuit 5. The safety return circuit 15 receives the outputs from the storing circuit 11 and the timer circuit 14, and transmits a signal to the lamp buzzer circuit 16, to retain a checking condition. It is noted that, as a method of identifying return safety, when the return button 13 is operated, the shutoff valve 3 is opened, gases are filled in the pipe, and then, the shutoff valve 3 is closed. After that, it is monitored whether a residual gas pressure is reduced within a certain time limit (e.g., about five to fifteen minutes). During that time, a lamp is repeatedly turned on and off to notify a checking condition. In this case, when the gas pressure is not reduced, a normal operation can be performed after completing the check. When the use gas pressure is reduced below a certain value, the shutoff valve 3 is closed, and a lamp is repeatedly turned on and off, or a buzzer rings. In other words, since the shutoff valve 3 is not opened, the gas cannot be used.
[Patent Document 1] JP-A-56-160520

DISCLOSURE OF THE INVENTION

However, according to the above conventional construction, a long determination time is required in order to operate the return button and the timer circuit, monitor whether or not the gas pressure is reduced below a certain value for a certain time, and determine whether or not there is leakage. Therefore, it takes a long time to determine whether or not there is leakage during the return operation, or to shutoff a line when it is determined that there is leakage.

The present invention is contrived to solve the aforementioned problems, and has an object to provide a gas shutoff apparatus for rapidly performing gas leakage determination on whether or not there is use of gases such as a city gas and an LP gas when the gas shutoff apparatus is operated and then returned, in order to monitor whether of not a use condition of gas equipment is safe.

In addition, the present invention has an object to provide a gas shutoff apparatus for rapidly and certainly performing gas leakage determination on whether or not gases such as a city gas or an LP gas are minutely leaked due to unstable locking of an original plug of the equipment when the gas shutoff apparatus performs a shutoff operation and then is returned to an initial state, in order to monitor whether or not a use condition of the gas equipment is safe.

In order to achieve the aforementioned object, according to the present invention, a use condition of gas equipment is monitored. An abnormality determination unit determines whether or not a use flow volume obtained by detecting a flow velocity obtained by measuring a signal transfer time in a medium using a flow volume detection return unit and converting the detected flow velocity into a flow volume using a flow volume calculation unit. When the shutoff unit shuts off a fluid path when it is determined that there is abnormality, a return signal is output from a return unit to a shutoff unit in order to use the gas again by opening the fluid path. Simultaneously, when a return time-counting unit starts the time-counting operation, and then, a predetermined time period has been elapsed, whether or not a predetermined flow volume or greater flows is determined using the flow volume calculation unit in order to identify whether or not all of the gas plugs of the gas equipment connected to the downstream of the gas shutoff apparatus are closed. When it is determined that a predetermined flow volume or greater flows, the leakage determination unit determines that there is leakage, and a driving signal is output to the shutoff unit to close the fluid path.

As a result, even after a use condition of the gas equipment is monitored, an abnormal use condition such as a significantly large amount of flux is detected, the gas shutoff apparatus shuts off the fluid path, and then the return unit drives the shutoff unit in order to open the fluid path and use the gas again, whether or not the gas equipment can be used again or whether or not the gas leaks can be rapidly determined. When the gas leaks, it is possible to immediately shutoff the gas. Also, it is possible to accurately determine whether or not there is leakage, or whether or not the gas equipment is recovered to a normal setup condition. In addition, since the use condition can be monitored, it does not take a long time to determine leakage in a leakage condition. Therefore, it is possible to prevent leakage of raw gases in a short time.

According to the present invention, a use condition of gas equipment is monitored. An abnormality determination unit determines whether or not a use flow volume obtained by detecting a flow velocity obtained by measuring a signal transfer time in a medium using a flow volume detection return unit and converting the detected flow velocity into a flow volume using a flow volume calculation unit. When the shutoff unit shuts off a fluid path when it is determined that there is abnormality, a return signal is output from a return unit to a shutoff unit in order to use the gas again by opening the fluid path. Simultaneously, when a return time-counting unit starts the time-counting operation, a predetermined time period has been elapsed, and then, the leakage determination unit detects that the pressure in the pipe is reduced to a predetermined pressure or lower using a pressure detection unit which detects the pressure in the fluid path in order to identify whether or not all of the gas plugs of the gas equipment connected to the downstream of the gas shutoff apparatus are closed, a driving signal is output to the shutoff unit to close the fluid path.

As a result, even after a use condition of the gas equipment is monitored, an abnormal use condition such as a significantly large amount of flux is detected, the gas shutoff apparatus shuts off the fluid path, and then the return unit drives the shutoff unit in order to open the fluid path and use the gas again, whether or not the gas equipment can be used again or whether or not the gas leaks can be rapidly determined by identifying whether or not the supply pressure is reduced. When the gas leaks, it is possible to immediately shutoff the gas. Also, it is possible to accurately determine whether or not there is leakage, or whether or not the gas equipment is recovered to a normal setup condition. In addition, since the use condition can be monitored, it does not take a long time to determine leakage in a leakage condition. Therefore, it is possible to prevent leakage of raw gases in a short time.

As described above, according to the present invention, it is identified whether or not a user forgets to close the equipment plug, or whether or not there is gas leakage, after abnormality is detected during use of the gas equipment, the shutoff unit close the fluid path, and then, the shutoff unit is recovered using return unit. Since gases leaks after the shutoff, the gas pressure is reduced. When the return operation is performed, the pipe length from the gas shutoff apparatus to the gas equipment is filled with gases. Although the time for determining leakage is different depending on the pipe length through which the fluid flows, the leakage determination is performed on the basis of the flow volume obtained from the flow velocity detection unit without erroneously determining the flow volume measured when the pipe is filled with gases as the leakage. Therefore, it is possible to determine, in a short time, whether or not the gas equipment can be used again. In addition, it is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff. Therefore, convenience and safety can be improved.

As described above, according to the present invention, it is identified whether or not a user forgets to close the equipment plug, or whether or not there is gas leakage, after abnormality is detected during use of the gas equipment, the shutoff unit close the fluid path, and then, the shutoff unit is recovered using return unit. Since gases leaks after the shutoff, the gas pressure is reduced. When the return operation is performed, the pipe length from the gas shutoff apparatus to the gas equipment is filled with gases. The time for determining leakage is different depending on the pipe length through which the fluid flows. The supply pressure becomes safe as a blockage pressure when the pipe is filled with gases, and the all of the corks of the equipment in the downstream are closed. On the other hand, when a user in a customer premise is confused and opens the plug, the supply pressure is reduced from the blockage pressure to the control pressure. Therefore, the leakage determination is performed on the basis of the pressure obtained from the pressure detection unit without erroneously determining the flow volume measured when the pipe is opened. As a result, it is possible to determine, in a short time, whether or not the gas equipment can be used again. In addition, it is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff. Therefore, convenience and safety can be improved.

BEST MODE FOR CARRYING OUT THE INVENTION

Figure 1:
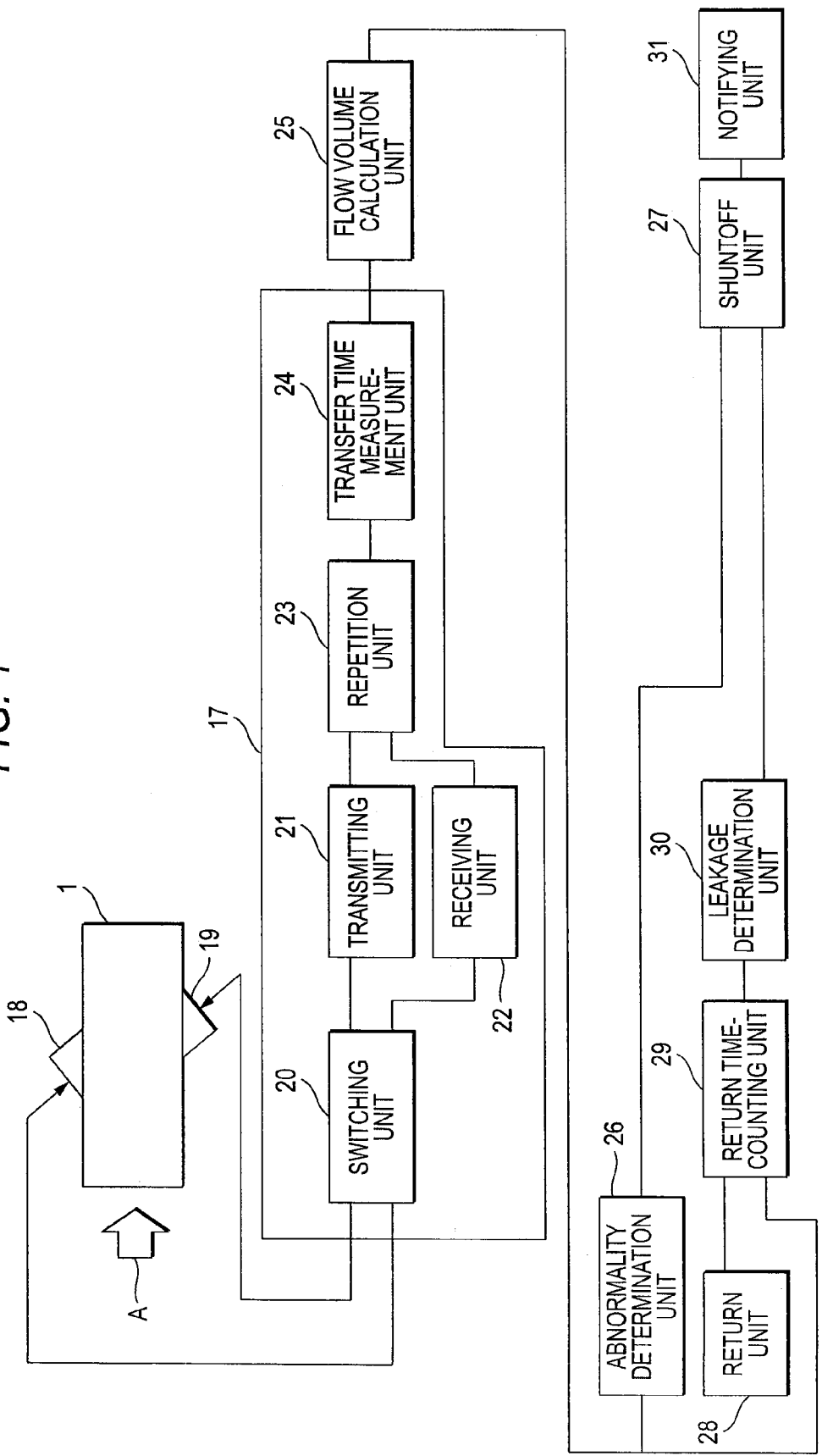
FIG. 1 is a control block diagram illustrating a gas shutoff apparatus according to the first embodiment of the present invention.

According to the present invention, there is provided a gas shutoff apparatus comprising: a flow velocity detection unit for detecting a flow velocity by measuring a signal transfer time in a medium; a flow volume calculation unit for converting the flow velocity detected by the flow velocity detection unit into a flow volume; an abnormality determination unit for determining whether or not the use flow volume obtained by the flow volume calculation unit is normal; a shutoff unit for shutting off a fluid path when the abnormal determination unit determines that there is abnormality; a return unit for outputting a return signal to the shutoff unit in order to open the fluid path; a return time-counting unit for starting a time-counting using a return unit; a leakage determination unit for outputting a driving signal to the shutoff unit to shutoff the a fluid path when it is detected that the flow volume obtained by the flow volume calculation unit is equal to or larger than a predetermined flow volume after the return time-counting unit determines that a predetermined time has been elapsed.

When the gas equipment is used again after the shutoff unit shuts off a fluid path when the abnormality determination unit detects an abnormal use condition of the gas equipment, the return unit drives the shutoff unit to open the fluid path. However, the gas in the pipe is leaked, and the gas pressure is reduced until the equipment plug is closed after the shutoff. When the return operation is performed, and then, the gas is filled in the pipe, a large amount of flux initially flows, and the flow volume is reduced after the pipe is fully filled with the gases. In the meanwhile, while the return time-counting unit counts timings, leakage determination based on the flow volume detected by the flow velocity detection unit can be delayed. As a result, without erroneous determination due to leakage caused by forgetting to close the plug, whether or not the gas equipment is available can be rapidly determined with the flow volume measured when the flow volume becomes stable after that. Therefore, when the gas equipment is used again, it does not take a long time to check whether or not the cork or the like of the gas equipment is closed or whether or not there is leakage in the pipe length from the equipment in each customer premise to the gas shutoff apparatus. Accordingly, it is possible to accurately and rapidly monitor the leakage caused by problems in the gas pipes or the like, thus improving convenience or safety.

In addition, in order to achieve the aforementioned object, the gas shutoff apparatus according to the present invention comprises: a flow velocity detection unit for detecting a flow velocity by measuring a signal transfer time in a medium; a flow volume calculation unit for converting the flow velocity detected by the flow velocity detection unit into a flow volume; an abnormality determination unit for detecting whether or not the use flow volume obtained by the flow volume calculation unit is normal; a shutoff unit for shutting off a fluid path when the abnormality determination unit determines that there is abnormality; a return unit for outputting a return signal to the shutoff unit in order to open the fluid path; a return time-counting unit for starting time-counting using the return unit; a return determination unit for determining whether or not the detected flow volume from the flow volume calculation unit after return is within a predetermined flow volume and changing the determination value of the return time-counting unit; and a leakage determination unit for outputting a driving signal to the shutoff unit and shutting off the fluid path when it is detected that the flow volume obtained by the flow volume calculation unit is equal to or larger than a predetermined flow volume after the return time-counting unit determines that a predetermined time has been elapsed.

In addition, in order to use the gas equipment again after the abnormality determination unit detects an abnormal use condition of the gas equipment, and the shutoff unit shuts off a fluid path, the return unit drives the shutoff unit to open the fluid path. However, the gas in the pipe is leaked, and the gas pressure is reduced until the plug of the gas equipment is closed after the shutoff. When the return operation is performed after that, a large amount of flux initially flows in the pipe until the gas pressure in the pipe reaches a supply gas pressure, and the flow volume is reduced when the pipe is fully filled with the gases. Although a time period for flowing the large amount of flux is different depending on a pipe length between the gas equipment and the gas shutoff apparatus placed in each customer premise, leakage determination based on the flow volume detected by the flow velocity detection unit can be delayed by previously examining a time period for reducing the flow volume below a predetermined flow volume using the return determination unit, setting the time period in the return time-counting unit, and then, performing time-counting using the determination time of the return time-counting unit. As a result, without erroneous determination due to leakage caused by forgetting to close the gas plug, whether or not the gas equipment is available can be rapidly determined with the flow volume measured when the flow volume becomes stable after that. Therefore, when the gas equipment is used again, it does not take a long time to check whether or not the cork or the like of the gas equipment is closed or whether or not there is leakage in the pipe length between the equipment in each customer premise and the gas shutoff apparatus. Accordingly, it is possible to accurately and rapidly monitor the leakage caused by problems in the gas pipes or the like, thus improving convenience or safety.

In addition, in order to achieve the aforementioned object, a gas shutoff apparatus according to the present invention comprises: a flow velocity detection unit for measuring a signal transfer time in a medium and detecting a flow velocity; a flow volume calculation unit for converting the flow velocity detected by the flow velocity detection unit into a flow volume; an abnormality determination unit for determining whether or not the use flow volume obtained by the flow volume calculation unit is normal; a shutoff unit for shutting off a fluid path when the abnormality determination unit determines that there is abnormality; a return unit for outputting a return signal to the shutoff unit in order to open the fluid path; a return time-counting unit for starting time-counting using the return unit; a return flow volume determination unit for determining whether or not the detected flow volume after a predetermined time period from the return time-counting unit is equal to or larger than a predetermined value; and a leakage determination unit for determining whether or not the flow volume increases to a predetermined value after the return flow volume determination unit determines that the detected flow volume is equal to or larger than a predetermined flow volume, determining leakage, and outputting a driving signal to the shutoff unit to shutoff the fluid path when it is determined that the flow volume increases to the predetermined value.

When the gas equipment is used again after the shutoff unit shuts off a fluid path when the abnormality determination unit detects an abnormal use condition of the gas equipment, the return unit drives the shutoff unit to open the fluid path. However, the gas in the pipe is leaked, and the gas pressure is reduced until the equipment plug is closed after the shutoff. When the return operation is performed, and then, the gas is filled in the pipe, a large amount of flux initially flows, and the flow volume is reduced after the pipe is fully filled with the gases. In the meanwhile, while the return time-counting unit counts timings, leakage determination based on the flow volume detected by the flow velocity detection unit is delayed. Then, the return flow volume determination unit determines whether or not the flow volume is smaller than a predetermined value. When the flow volume is equal to or larger than the predetermined value, it is determined that the possibility of leakage caused by forgetting to close the plug is high. In addition, it is also monitored whether or not the flow volume increases over a predetermined flow volume. When the flow volume increases and then reaches a predetermined value, it is determined that there is leakage, and a shutoff output is executed. Therefore, a minute flow volume remains after the return operation is performed and a predetermined time period has been elapsed. Then, the flow volume value has a tendency to increase when the equipment plug is not appropriately closed. Although a time for changing the flow volume to determine leakage is different depending on the pipe length from the equipment in each customer premise to the gas shutoff apparatus, it is possible to appropriately determine leakage regardless of the pipe length condition of each customer premise without erroneously determining that the equipment is usable while the gas equipment plug is opened with a stable flow volume after a predetermined time period has been elapsed by the return time-counting unit. Accordingly, it is possible to prevent long-time determination, and accurately and rapidly monitor the leakage caused by problems in the gas pipes or the like, thus improving convenience or safety.

In addition, in order to achieve the aforementioned object, a gas shutoff apparatus according to the present invention comprises: a flow velocity detection unit which detects a flow velocity by measuring a signal transfer time in a medium; a flow volume calculation unit which converts the flow velocity detected by the flow velocity detection unit into a flow volume; an abnormality determination unit which determines whether or not a use flow volume obtained by the flow volume calculation unit is normal; a shutoff unit which shuts off a fluid path when the abnormality determination unit determines that there is abnormality; a return unit which outputs a return signal to the shutoff unit in order to open the fluid path; a return time-counting unit which starts a time-counting by the return unit; a return flow volume determination unit which determines whether or not the detected flow volume of the flow volume calculation unit is equal to or greater than a predetermined value after a predetermined time period counted by the return time-counting unit; a flow volume variation determination unit which calculates a flow volume variation gradient when the return flow volume determination unit determines that the flow volume is equal to or greater than the predetermined flow volume; and a leakage estimation unit which determines that there is leakage and outputs a driving signal to the shutoff unit to shutoff the fluid path when the flow volume variation determination unit estimates that the flow volume variation will reach a predetermined flow volume or greater within a predetermine time period.

When the gas equipment is used again after the shutoff unit shuts off the fluid path when the abnormality determination unit detects an abnormal use condition of the gas equipment, the return unit drives the shutoff unit to open the fluid path. However, the gas in the pipe is leaked, and the gas pressure is reduced until the equipment plug is closed after the shutoff. When the return operation is performed, and then, the gas is filled in the pipe, a large amount of flux initially flows, and the flow volume is reduced after the pipe is fully filled with the gas. In the meanwhile, while the return time-counting unit counts timings, leakage determination based on the flow volume detected by the flow velocity detection unit is delayed. Then, the return flow volume determination unit determines whether or not the flow volume is within a predetermined value. When the flow volume is equal to or larger than the predetermined value, it is determined that the possibility of leakage caused by forgetting to close the plug is high, and the monitoring continues to be performed. In addition, when the flow volume variation determination unit detects an increasing flow volume variation gradient, the leakage estimation unit estimates whether or not the flow volume increases to a value equal to or larger than a predetermined flow volume within a predetermined time period. When the flow volume has reached a predetermined value, it is determined that there is leakage, and a shutoff output is executed. Therefore, a minute flow volume remains after the return operation is performed and a predetermined time period has been elapsed. Then, the flow volume value has a tendency to increase when the equipment plug is not appropriately closed. Although a time for changing the flow volume to determine leakage is different depending on the pipe length from the equipment in each customer premise to the gas shutoff apparatus, it is possible to appropriately determine leakage regardless of the pipe length condition of each customer premise without erroneously determining that the equipment is usable while the gas equipment plug is opened with a stable flow volume after a predetermined time period has been elapsed by the return time-counting unit. Accordingly, it is possible to accurately and rapidly monitor the leakage caused by problems in the gas pipes or the like, thus improving convenience or safety.

In addition, in order to achieve the aforementioned object, a gas shutoff apparatus according to the present invention comprises: a flow velocity detection unit which detects a flow velocity by measuring a signal transfer time in a medium; a flow volume calculation unit which converts the flow velocity detected by the flow velocity detection unit into a flow volume; an abnormality determination unit which determines whether or not a use flow volume obtained by the flow volume calculation unit is normal; a shutoff unit which shuts off a fluid path through which the medium flows when the abnormality determination unit determines that there is abnormality; a pressure detection unit which detects a pressure in the fluid path; a pressure determination unit which determines whether or not the detected pressure of the pressure detection unit is equal to or smaller than a predetermined pressure; a return unit which outputs a return signal to the shutoff unit in order to open the fluid path; a return time-counting unit which starts a time-counting on the basis of the return operation of the return unit; and a leakage determination unit which outputs a driving signal to the shutoff unit to shutoff the fluid path when the return time-counting unit counts that a predetermined time period has been elapsed, and the pressure determination unit determines that the detected pressure is equal to or smaller than the predetermined pressure.

When the gas equipment is used again after the shutoff unit shuts off the fluid path when the abnormality determination unit detects an abnormal use condition of the gas equipment, the return unit drives the shutoff unit to open the fluid path. However, the gas in the pipe is leaked, and the gas pressure is reduced until the equipment plug is closed after the shutoff. When the return operation is performed, and then, the gas is filled in the pipe, a large amount of flux initially flows to fill the gas in the pipe. Then, the flow volume is reduced, and the pressure increases to a blockage pressure level. In the meanwhile, while the return time-counting unit counts timings, leakage determination based on the flow volume detected by the flow velocity detection unit can be delayed. As a result, without erroneous determination due to leakage caused by forgetting to close the plug, whether or not the gas equipment is available can be rapidly determined with the flow volume measured when the flow volume becomes stable after that. Therefore, when the gas equipment is used again, it does not take a long time to check whether or not the cork or the like of the gas equipment is closed or whether or not there is leakage in the pipe length from the equipment in each customer premise to the gas shutoff apparatus. Accordingly, it is possible to accurately and rapidly monitor the leakage caused by problems in the gas pipes or the like, thus improving convenience or safety.

In addition, in order to achieve the aforementioned object, a gas shutoff apparatus according to the present invention comprises: a flow velocity detection unit which detects a flow velocity by measuring a signal transfer time in a medium; a flow volume calculation unit which converts the flow velocity detected by the flow velocity detection unit into a flow volume; an abnormality determination unit which determines whether or not a use flow volume obtained by the flow volume calculation unit is normal; a shutoff unit which shuts off a fluid path through which the medium flows when the abnormality determination unit determines that there is abnormality; a pressure detection unit which detects a pressure in the fluid path; a return unit which outputs a return signal to the shutoff unit in order to open the fluid path; a return time-counting unit which starts a time-counting using the return unit; a pressure storing unit which stores the pressure detected by the pressure detection unit while the equipment is in use; and a leakage determination unit which outputs a driving signal to the shutoff unit to shutoff the fluid path when the return time-counting unit counts that a predetermined time period has been elapsed, and the pressure determination unit determines that the detected pressure is equal to or smaller than the predetermined pressure.

When the gas equipment is used again after the shutoff unit shuts off the fluid path when the abnormality determination unit detects an abnormal use condition of the gas equipment, the return unit drives the shutoff unit to open the fluid path. However, the gas in the pipe is leaked, and the gas pressure is reduced until the equipment plug is closed after the shutoff. When the return operation is performed, and then, the gas is filled in the pipe, a large amount of flux initially flows to fill the gas in the pipe. Then, the flow volume is reduced, and the pressure reaches an original blockage pressure which is greater than the control voltage of the pressure storing unit. Although a time period for flowing the large amount of flux is different depending on a pipe length between the gas equipment and the gas shutoff apparatus placed in each customer premise, it is possible to prevent erroneous leakage determination on the basis of the flow volume detected using the flow velocity detection unit by previously examining a time period for reducing the flow volume within a predetermined flow volume using the return determination unit, setting the time period in the return time-counting unit, and then, performing time-counting using the determination time of the return time-counting unit. As a result, without erroneous determination due to leakage caused by forgetting to close the gas plug, whether or not the gas equipment is available can be rapidly determined by comparing the pressure measured after that with the control pressure stored in the pressure storing unit during the equipment is in use. Therefore, when the gas equipment is used again, it does not take a long time to check whether or not the cork or the like of the gas equipment is closed or whether or not there is leakage in the pipe length between the equipment in each customer premise and the gas shutoff apparatus. Accordingly, it is possible to accurately and rapidly monitor the leakage caused by problems in the gas pipes or the like, thus improving convenience or safety.

In addition, in order to achieve the aforementioned object, a gas shutoff apparatus according to the present invention comprises: a flow velocity detection unit which detects a flow velocity by measuring a signal transfer time in a medium; a flow volume calculation unit which converts the flow velocity detected by the flow velocity detection unit into a flow volume; an abnormality determination unit which determines whether or not a use flow volume obtained by the flow volume calculation unit is normal; a shutoff unit which shuts off a fluid path through which the medium flows when the abnormality determination unit determines that there is abnormality; a pressure detection unit which detects a pressure in the fluid path; a return unit which outputs a return signal to the shutoff unit in order to open the fluid path; a return time-counting unit which starts a time-counting on the basis of the return operation of the return unit; a pressure storing unit which stores a pressure of fluid detected by the pressure detection unit while the equipment is not in use; a pressure variation determination unit which determines a pressure variation gradient on the basis of the output signal of the pressure detection unit when the return time-counting unit counts that a predetermined time period has been elapsed; and a leakage estimation unit which determines that there is leakage and outputs a driving signal to the shutoff unit to shutoff the fluid path when the pressure variation determination unit estimates that the pressure variation will reach a predetermined pressure or smaller within a predetermine time period.

When the gas equipment is used again after the shutoff unit shuts off the fluid path when the abnormality determination unit detects an abnormal use condition of the gas equipment, the return unit drives the shutoff unit to open the fluid path. However, the gas in the pipe is leaked, and the gas pressure is reduced until the equipment plug is closed after the shutoff. When the return operation is performed, and then, the gas is filled in the pipe, a large amount of flux initially flows to fill the gas in the pipe. Then, the flow volume is reduced, and the pressure increases to a blockage pressure level. In the meanwhile, while the return time-counting unit counts timings, erroneous leakage determination based on the flow volume detected by the flow velocity detection unit can be prevented. Even when a user forgets to close the plug, it can be determined that there is leakage by monitoring a variation or the pressure detected using the pressure detection unit and detecting that reduction from the blockage pressure level to the control pressure level. The variation of the pressure is used to rapidly determine whether or not the gas equipment can be used. Therefore, when the gas equipment is used again, it does not take a long time to check whether or not the cork or the like of the gas equipment is closed or whether or not there is leakage in the pipe length from the equipment in each customer premise to the gas shutoff apparatus. Accordingly, it is possible to accurately and rapidly monitor the leakage caused by problems in the gas pipes or the like, thus improving convenience or safety.

In addition, in order to achieve the aforementioned object, a gas shutoff apparatus according to the present invention comprises: a flow velocity detection unit which detects a flow velocity by measuring a signal transfer time in a medium; a flow volume calculation unit which converts the flow velocity detected by the flow velocity detection unit into a flow volume; an abnormality determination unit which determines whether or not a use flow volume obtained by the flow volume calculation unit is normal; a shutoff unit which shuts off a fluid path when the abnormality determination unit determines that there is abnormality; a pressure detection unit which detects a pressure in the fluid path; a return unit which outputs a return signal to the shutoff unit in order to open the fluid path; a return time-counting unit which starts a time-counting on the basis of the return operation of the return unit; a pressure storing unit which stores the pressure detected by the pressure detection unit while the equipment is used; a pressure determination unit which determines whether or not the pressure detected by the pressure detection unit is equal to or smaller than the pressure stored in the pressure storing unit; and a priority leakage determination unit which outputs a driving signal to the shutoff unit to shutoff the fluid path on the basis of the earlier one of the determination signal which is output when the return time-counting unit counts that a predetermined time period has been elapsed and it is determined that the flow volume detected by the flow velocity detection unit is equal to or greater than a predetermined value, and the determination signal which is output when the pressure detected by the pressure detection unit and the pressure stored in the storing unit are compared and it is detected that the pressure is equal to or smaller than a predetermined pressure.

When the gas equipment is used again after the shutoff unit shuts off the fluid path when the abnormality determination unit detects an abnormal use condition of the gas equipment, the return unit drives the shutoff unit to open the fluid path. However, the gas in the pipe is leaked, and the gas pressure is reduced until the equipment plug is closed after the shutoff. When the return operation is performed, and then, the gas is filled in the pipe, a large amount of flux initially flows to fill the gas in the pipe. Then, the flow volume is reduced, and the pressure is recovered to a blockage pressure level. However, while the return time-counting unit counts timings, erroneous leakage determination based on the flow volume detected by the flow velocity detection unit is prevented. Then, the return flow volume determination unit determines whether or not the flow volume is within a predetermined value. When the flow volume is equal to or larger than the predetermined value, it is determined that the possibility of leakage caused by forgetting to close the plug is high, and the monitoring continues to be performed. In addition, when the pressure detection unit detects that a variation from the blockage pressure to the control voltage, it is determined that the possibility of leakage is high. The leakage determination unit detects a case that the equipment plug is not appropriately closed even after the return operation to stop supplying of the gas again on the basis of the earliest one of whether or not the flow volume detected by the flow volume detection return unit is equal to or larger than a predetermined flow volume or whether or not the pressure signal from the pressure detection unit detects a variation from the blockage pressure to the control pressure. Although a time for changing the flow volume to determine leakage is different depending on the pipe length from the equipment in each customer premise to the gas shutoff apparatus, it is possible to appropriately determine leakage according to the pipe length condition of each customer premise without erroneously determining that the equipment is usable while the gas equipment plug is opened with a stable flow volume after a predetermined time period has been elapsed by the return time-counting unit. In addition, it is possible to accurately and rapidly monitor the leakage caused by problems in the gas pipes or the like, thus improving convenience or safety.

Hereinafter, first to eighth embodiments of the present invention will be described with reference to FIGS. 1 to 8. In FIGS. 1 to 8, like reference numerals denotes like elements having the same functions as those of FIG. 9. In addition, the present invention is not limited to the present embodiments.

First Embodiment

FIG. 1 illustrates a gas shutoff apparatus according to the first embodiment of the present invention. A reference numeral 17 denotes a flow velocity detection unit, which transmits an ultrasound signal between an upstream vibrator 18 and a downstream vibrator 19, oppositely installed in a fluid path 1 of a gas medium such as a city gas or an LPG and detects a flow velocity of the use gas on the basis of its transfer time. For example, the flow velocity detection unit 17 may be constructed as follows. Specifically, the flow velocity detection unit 17 comprises a switching return unit 20, a transmitting return unit 21, a receiving return unit 22, a repetition return unit 23, and a transfer time measurement return unit 24. The transmitting return unit 21 and the receiving return unit 22 are connected to the switching return unit 20. The switching return unit 20 alternately changes a connection destination between the transmitting return unit 21 and the receiving return unit 22, such that the transmitting return unit 21 and the receiving return unit 22 are connected to the upstream vibrator 18 and the downstream vibrator 19, respectively, and then, the transmitting return unit 21 and the receiving return unit 22 are connected to the downstream vibrator 19 and the upstream vibrator 18, respectively. The ultrasound signal transmitted from the transmitting return unit 21 passes from the upstream vibrator 18 through the fluid path, and then received from the downstream vibrator 19 to the receiving return unit 22 when the receiving return unit 22 is connected to the upstream vibrator 18 while the transmitting return unit 21 is connected to the downstream vibrator 19 using the switching return unit 20. The repetition return unit 23 repeatedly performs this transmission/receipt of the ultrasound signal, and repeatedly performs measurement of the signal transfer time using the transfer time measurement return unit 24 in the meanwhile. The transfer time measurement return unit 24 measures and accumulates the time taken from the transmission to the receipt of the ultrasound signal. Subsequently, the aforementioned operations are repeated by connecting the receiving return unit 22 and the transmitting return unit 21 to the downstream vibrator 19 and the upstream vibrator 18, respectively, using the switching return unit 20. The transfer time measurement return unit 24 obtains a transfer time difference between the transfer time obtained by initially receiving the ultrasound signal and the signal transfer time measured by switching the destination using the switching return unit 20.

A reference numeral 25 denotes a flow volume calculation unit, which obtains an amount of the using medium, i.e., a gas flow volume, by converting the obtained transfer time. A reference numeral 26 denotes an abnormality determination unit, which determines whether or not there is an abnormal use condition on the basis of the gas use amount obtained using the flow volume calculation unit 25. For example, in order to monitor whether or not there is an abnormal condition, the abnormal determination unit 26 stores a total flow volume shutoff value for detecting an abnormally large amount of flux generated when a hose supplying the gas to the use equipment such as a stove is removed due to some reasons or a use time shutoff table defining a limitation of the use time corresponding to the case where the equipment is used for a longer time than the maximum use time for which the equipment is typically used. A reference numeral 27 denotes a shutoff unit 27, which outputs a shutoff signal and shuts off a gas path 1 when the abnormality determination unit 26 determines that there is an abnormal condition. A reference numeral 28 denotes a return unit, which detects, using a switch or the like, a return instruction issued in order to open the fluid path that has been closed by the shutoff unit 27 due to the abnormal condition and make the gas medium available again and drives the shutoff unit 27 to open the fluid path. A reference numeral 29 denotes a return time-counting unit, which performs a time-counting after the operation of the return unit 28 and prohibits the flow volume obtained by detecting the flow velocity using the flow velocity detection unit 17 and calculating it using the flow volume calculation unit 25 in the meanwhile from being a target for determining leakage. A reference numeral 30 denotes a leakage determination unit, which determines whether or not the flow volume value obtained using the flow volume calculation unit 25 is zero or within a predetermined flow volume by detecting a flow velocity using the flow velocity detection unit 27 after the shutoff unit 27 becomes opened using the return unit 28, and then, the return time-counting unit 29 counts a predetermined time period, and outputs a shutoff signal to the shutoff unit 27 when it is determined that the flow volume value is not zero or within a predetermined flow volume. A reference numeral 31 denotes a notifying return unit, which displays contents or conditions of the shutoff operation as well as notifies a center of monitoring safety of the gas through a telephone line or the like when the abnormality determination unit 26 determines that there is an abnormal gas use condition and drives the shutoff unit 27.

Hereinafter, operations of the above construction will be described. After the gas shutoff apparatus is installed, the use condition of the gas equipment is monitored using the fluid amount detected using the flow volume detection return unit 17. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25 is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 1, a reference symbol A denotes a direction where the gas medium flows.

When the abnormality determination unit 26 determines that the obtained flow volume is abnormal, the shutoff signal is output to the shutoff unit 27. Accordingly, the shutoff unit 27 is driven, and the fluid path 1 is closed to stop supply of the gas. In addition, when the shutoff signal is output, the content of the shutoff is displayed on the notifying return unit 31. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, and when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the flow velocity detection unit 17 becomes zero or a value near zero. However, when the return unit 28 is operated to open the shutoff unit 27 without removing the cause of the shutoff for some reasons, a large amount of flux flows, and then, the flow volume initially becomes a value near zero. However, since the gas equipment plug located in the downstream of the pipe 1 is opened, the flow volume gradually increases and returns to the gas supply condition measured just before the shutoff although the gas is fully filled. The flow volume detected by the flow velocity detection unit 17 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed. The leakage determination unit 29 determines whether or not the gas flow volume obtained by detecting the flow velocity using the flow velocity detection unit 17 after a predetermined time period has been elapsed using the return time-counting unit 29 and converting it into the flow volume using the flow volume calculation unit 25 is equal to or larger than a predetermined flow volume. When the leakage determination unit 29 detects a predetermined flow volume or greater, it is determined that there is gas leakage, and the shutoff signal is output to the shutoff unit 27 again to stop supplying the gas. In other words, since it is determined whether or not the cause of the shutoff is removed by detecting whether or not there is a gas flow using the flow velocity detection unit 17 without erroneously determining that there is leakage even when the shutoff unit 27 is opened by driving it and a transient state in which the pipe is filled with the gas is detected, it is possible to determine whether or not there is leakage in a short time. When the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined using the flow velocity signal of the flow velocity detection unit 17 without depending on the variation of the flow volume in the pipe. Therefore, it is possible to determine whether or not the gas equipment can be used again in a short time. In addition, it is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff. Therefore, use convenience and safety can be improved.

Second Embodiment

Figure 2:
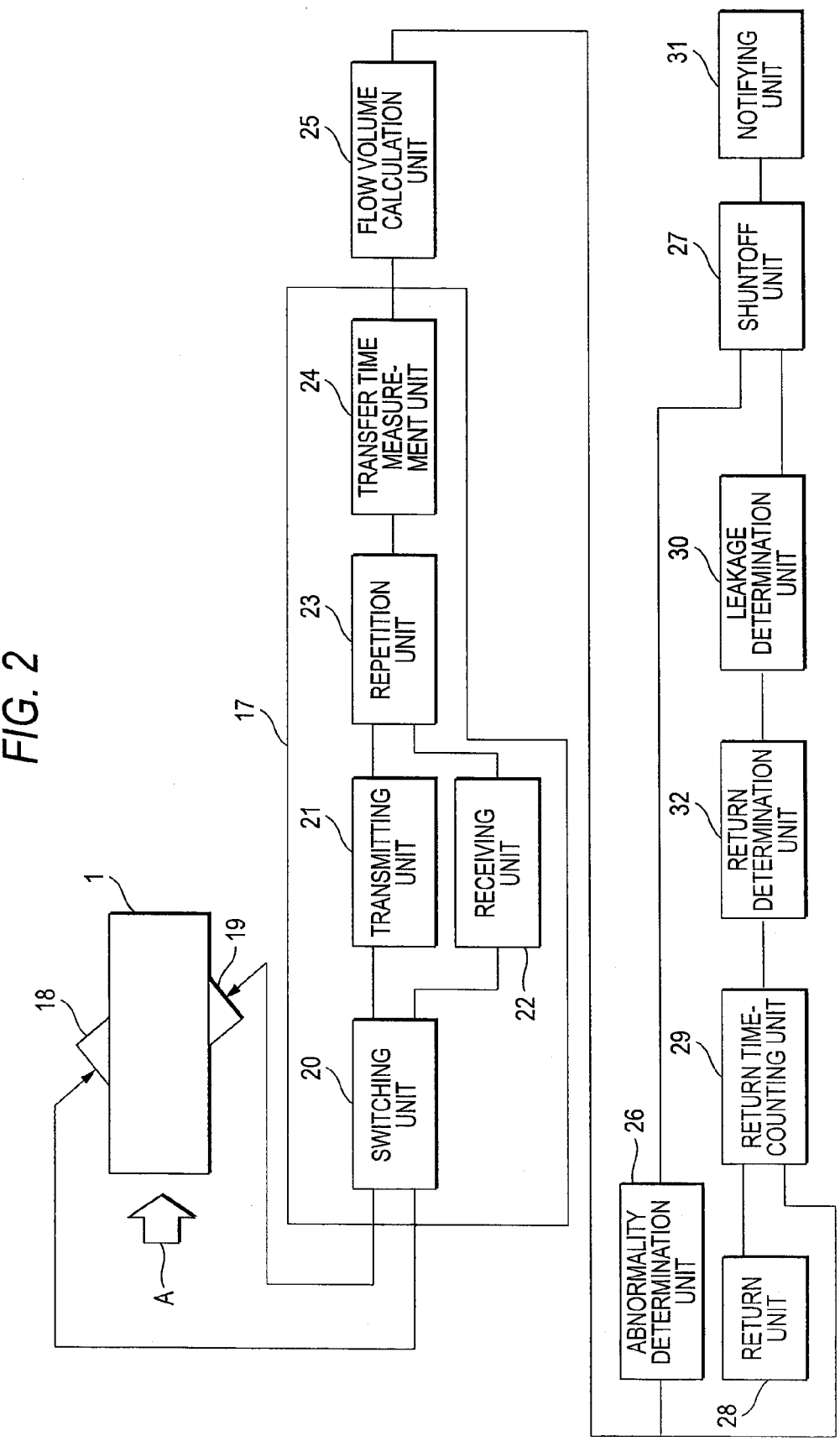
FIG. 2 is a control block diagram illustrating a gas shutoff apparatus according to the second embodiment of the present invention.

FIG. 2 illustrates a gas shutoff apparatus according to the second embodiment of the present invention. In FIG. 2, like reference numerals denotes like elements having the same functions as those of FIGS. 1, 3, 4, and 9, and their descriptions are omitted.

In FIG. 2, a reference numeral 32 denotes a return determination unit. The return unit 28 is operated, and the return time-counting unit 29 counts that a predetermined time period has been elapsed. In the meanwhile, a large amount of flux flows until the gas pressure in the pipe reaches the same pressure as that of the upstream of the shutoff unit 27. Since a pipe length between the gas shutoff apparatus and the gas equipment is different for each customer premise, the time for filling the pipe to the same pressure is also different. However, this time is previously studied in each installation, and set in the return time-counting unit 29.

Subsequently, operations of the above construction will be described. After the gas shutoff apparatus is installed, the use condition of the gas equipment is monitored using a flow volume detected by the flow velocity detection unit 27. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25 is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 1, a reference symbol A denotes a direction where the gas medium flows.

When the abnormality determination unit 26 determines that the obtained flow volume is abnormal, the shutoff signal is output to the shutoff unit 27. Accordingly, the shutoff unit 27 is driven, and the fluid path 1 is closed to stop supply of the gas. In addition, when the shutoff signal is output, the content of the shutoff is displayed on the notifying return unit 31. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, and when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the flow velocity detection unit 17 becomes zero or a value near zero. However, when the return unit 28 is operated to open the shutoff unit 27 without removing the cause of the shutoff for some reasons, a large amount of flux flows, and then, the flow volume initially becomes a value near zero. However, since the gas equipment plug located in the downstream of the pipe 1 is opened, the flow volume gradually increases and returns to the gas supply condition measured just before the shutoff although the gas is fully filled. The flow volume detected by the flow velocity detection unit 17 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed. In this case, since a pipe length between the gas shutoff apparatus and the gas equipment in each customer premise is different. Although a large amount of flux flows until the pressure difference in the upstream of the shutoff unit 27 in the pipe 1 after the plug is opened, the return determination unit 32 determines the time for flowing a larger flow volume in each customer premise and stabilizing the fluid by previously studying it, and set the studied value to a determination value of the return time-counting unit 29.

The leakage determination unit 29 determines whether or not the gas flow volume obtained by detecting the flow velocity using the flow velocity detection unit 17 after a predetermined time period has been elapsed using the return time-counting unit 29 and converting it into the flow volume using the flow volume calculation unit 25 is equal to or larger than a predetermined flow volume. When the leakage determination unit 29 detects a predetermined flow volume or greater, it is determined that there is gas leakage, and the shutoff signal is output to the shutoff unit 27 again to stop supplying the gas. In other words, since it is determined whether or not the cause of the shutoff is removed by detecting whether or not there is a gas flow using the flow velocity detection unit 17 without erroneously determining that there is leakage even when the shutoff unit 27 is opened by driving it and a transient state in which the pipe is filled with the gas is detected, it is possible to determine whether or not there is leakage in a short time. When the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined using the flow velocity signal of the flow velocity detection unit 17 without depending on the variation of the flow volume in the pipe. Therefore, it is possible to determine whether or not the gas equipment can be used again in a short time. In addition, it is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff. Therefore, use convenience and safety can be improved.

Third Embodiment

Figure 3:
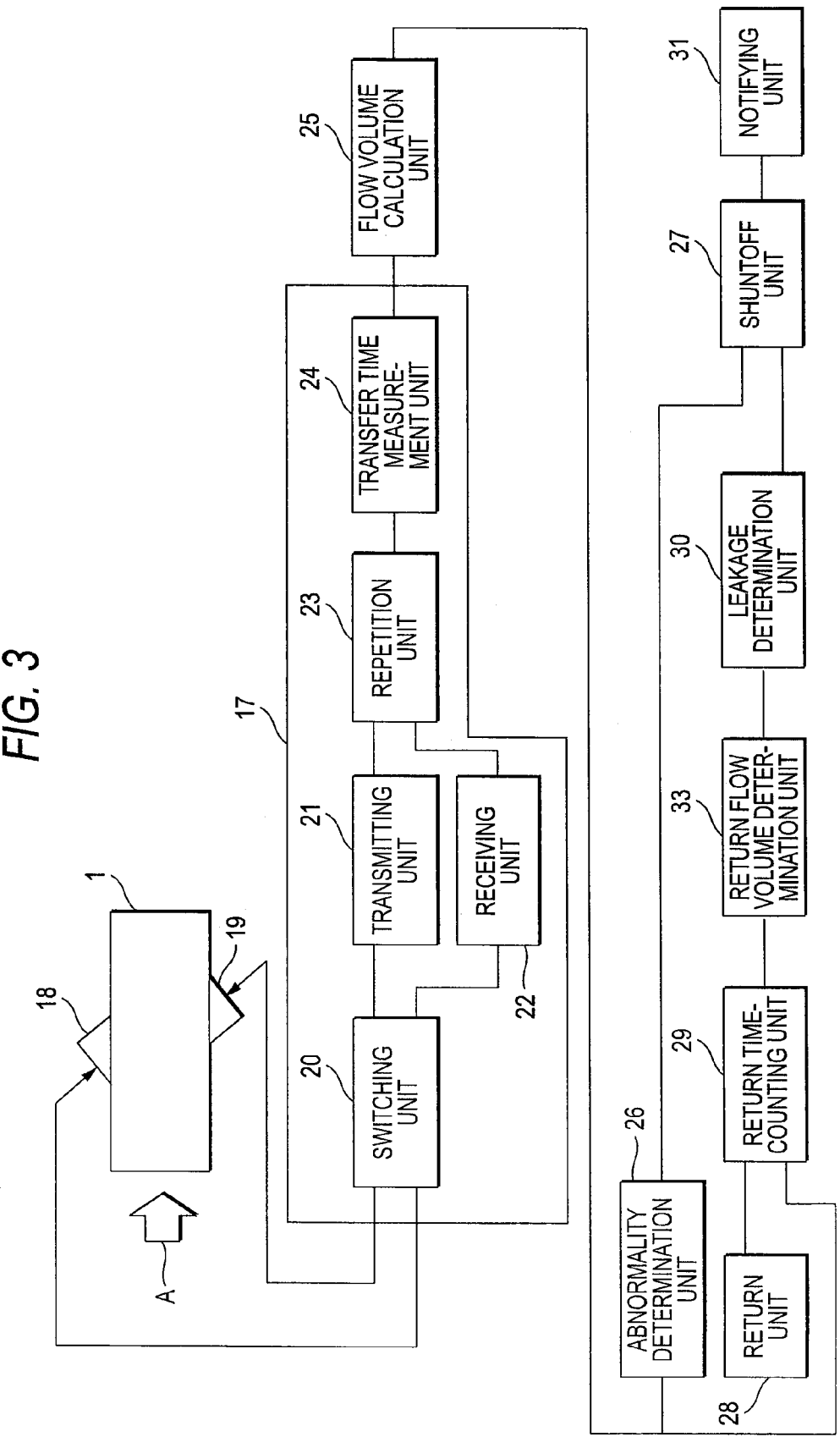
FIG. 3 is a control block diagram illustrating a gas shutoff apparatus according to the third embodiment of the present invention.

FIG. 3 illustrates a gas shutoff apparatus according to the third embodiment of the present invention. In FIG. 3, like reference numerals denotes like elements having the same functions as those of FIGS. 1, 2, 4, and 9, and their descriptions are omitted.

In FIG. 3, a reference numeral 33 denotes a return flow volume determination unit. The return unit 28 is operated, and the return time-counting unit 29 counts that a predetermined time period has been elapsed. In the meanwhile, a large amount of flux flows until the gas pressure in the pipe reaches the same pressure as that of the upstream of the shutoff unit 27. Since a pipe length between the gas shutoff apparatus and the gas equipment is different for each customer premise, the flow volume is reduced to a value near zero once the pipe is filled with the gas until the same pressure. However, when the cause of the shutoff is not removed for some reasons, and the equipment plug is recovered to an open state, the flow volume does not become zero, and a minute flow volume continues to flow. It is determined whether or not this minute flow volume is equal to or larger than a predetermined flow volume value.

Subsequently, operations of the above construction will be described. After the gas shutoff apparatus is installed, the use condition of the gas equipment is monitored using a flow volume detected by the flow velocity detection unit 27. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25, is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 1, a reference symbol A denotes a direction where the gas medium flows.

When the abnormality determination unit 26 determines that the obtained flow volume is abnormal, the shutoff signal is output to the shutoff unit 27. Accordingly, the shutoff unit 27 is driven, and the fluid path 1 is closed to stop supplying the gas. In addition, when the shutoff signal is output, the content of the shutoff is displayed on the notifying return unit 31. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, or when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the flow velocity detection unit 17 becomes zero or a value near zero. However, when the return unit 28 is operated to open the shutoff unit 27 without removing the cause of the shutoff for some reasons, a large amount of flux flows, and then, the flow volume initially becomes a value near zero. However, since the gas equipment plug located in the downstream of the pipe 1 is opened, the flow volume gradually increases and returns to the gas supply condition measured just before the shutoff although the gas is fully filled. The flow volume detected by the flow velocity detection unit 17 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed. In this case, a pipe length between the gas shutoff apparatus and the gas equipment in each customer premise is different. Although a large amount of flux flows until the pressure difference in the upstream of the shutoff unit 27 in the pipe 1 after the plug is opened, when the cause of the shutoff is not removed for some reasons, and the then the return operation is performed with the equipment plug being opened, a large amount of flux flows and then, the flow volume is stabilized to a minute value near zero. The return flow volume determination unit 33 determines whether or not the minute flow volume stabilized after a larger flow volume flows is equal to or larger than a predetermined value for each customer premise. When the minute flow volume is equal to or larger than the predetermined value, it is determined that there is possibility of leakage, and the return flow volume determination unit 33 does not determine that the return operation in which the gas is available is not completed, but continues to leakage determination.

After a predetermined minute flow volume is detected using the return flow volume determination unit 33, the leakage determination unit 29 determines whether or not the gas flow volume obtained by detecting the flow velocity using the flow velocity detection unit 17 and converting it into the flow volume using the flow volume calculation unit 25 increases to a predetermined flow volume. Although a large amount of flux flow so that the pressure in the pipe 1 becomes the same value as that of the upstream pressure, and the flow volume becomes a value near zero, when the plug is opened in the downstream, the flow volume does not become zero, but a minute flow volume near zero continues to flow. When the minute flow volume continues to stably flow for a predetermined time period, the flow volume starts to increase, and finally, an original flow volume measured when the equipment plug is opened flows. When the leakage determination unit 29 detects a predetermined flow volume or greater, it is determined that there is gas leakage, and the shutoff signal is output to the shutoff unit 27 again to stop supplying the gas. In other words, since it is determined whether or not the cause of the shutoff is removed by detecting whether or not there is a gas flow using the flow velocity detection unit 17 without erroneously determining that there is leakage even when the shutoff unit 27 is opened by driving it and a transient state in which the pipe is filled with the gas is detected, it is possible to determine whether or not there is leakage in a short time. When the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined using the flow velocity signal of the flow velocity detection unit 17 without depending on the variation of the flow volume in the pipe and without depending on the pipe length in each customer premise. Therefore, it is possible to determine whether or not the gas equipment can be used again in a short time. In addition, it is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff. Therefore, use convenience and safety can be improved.

Fourth Embodiment

Figure 4:
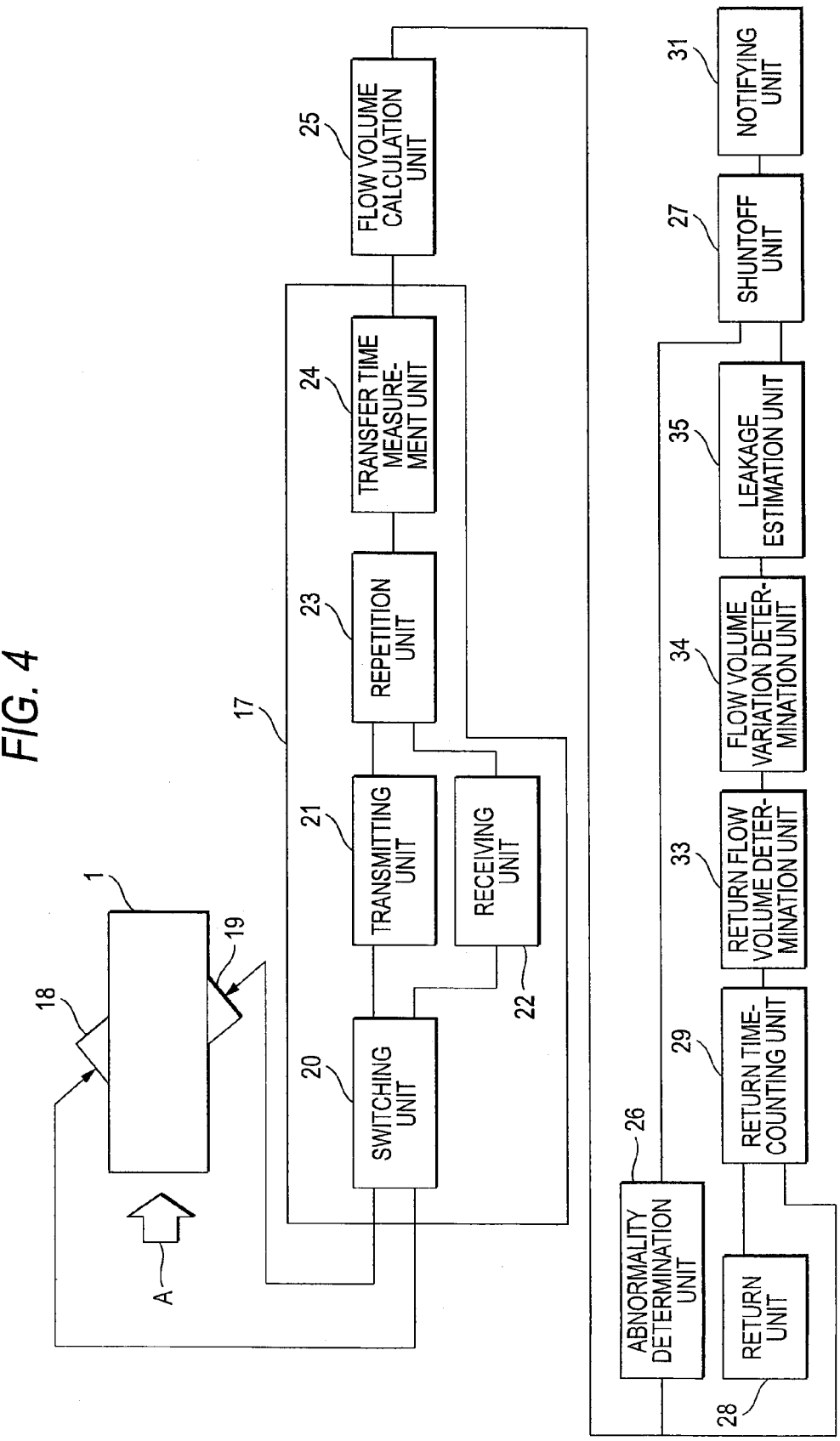
FIG. 4 is a control block diagram illustrating a gas shutoff apparatus according to the fourth embodiment of the present invention.

FIG. 4 illustrates a gas shutoff apparatus according to the fourth embodiment of the present invention. In FIG. 4, like reference numerals denotes like elements having the same functions as those of FIGS. 1, 2, 3, and 9, and their descriptions are omitted.

In FIG. 4, a reference numeral 34 denotes a flow volume variation determination unit. The return unit 28 is operated, and the return time-counting unit 29 counts that a predetermined time period has been elapsed. In the meanwhile, a large amount of flux flows until the gas pressure in the pipe reaches the same pressure as that of the upstream of the shutoff unit 27. Since a pipe length between the gas shutoff apparatus and the gas equipment is different for each customer premise, the flow volume is reduced to a value near zero once the pipe is filled with the gas until the same pressure. However, when the cause of the shutoff is not removed for some reasons, and the equipment plug is recovered to an open state, the flow volume does not become zero, and a minute flow volume continues to flow. Then, the flow volume gradually increases. The flow volume variation determination unit 34 determines whether or not this flow volume variation gradient is equal to or larger than a predetermined value. A reference numeral 35 denotes a leakage estimation unit, which determines, when the flow volume variation determination unit 34 detects a flow volume variation gradient, whether or not a leakage flow volume after a predetermined time period corresponding to the variation gradient has reached a predetermined value.

Subsequently, operations of the above construction will be described. After the gas shutoff apparatus is installed, the use condition of the gas equipment is monitored using a flow volume detected by the flow velocity detection unit 27. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25, is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 1, a reference symbol A denotes a direction where the gas medium flows.

When the abnormality determination unit 26 determines that the obtained flow volume is abnormal, the shutoff signal is output to the shutoff unit 27. Accordingly, the shutoff unit 27 is driven, and the fluid path 1 is closed to stop supplying the gas. In addition, when the shutoff signal is output, the content of the shutoff is displayed on the notifying return unit 31. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, or when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the flow velocity detection unit 17 becomes zero or a value near zero. However, when the return unit 28 is operated to open the shutoff unit 27 without removing the cause of the shutoff for some reasons, a large amount of flux flows, and then, the flow volume initially becomes a value near zero. Although this minute flow volume is different depending on the pipe length, it takes a long time to the pipe when the pipe length is long. Since the gas equipment plug located in the downstream of the pipe 1 is opened, when the gas is fully filled, the pressure difference from a second side of the equipment plug increases, and the flow volume gradually starts to increase and returns to the gas supply condition measured just before the shutoff. The flow volume detected by the flow velocity detection unit 17 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed. In this case, a pipe length between the gas shutoff apparatus and the gas equipment in each customer premise is different. Although a large amount of flux flows until the pressure difference in the upstream of the shutoff unit 27 in the pipe 1 after the plug is opened, when the cause of the shutoff is not removed for some reasons, and the then the return operation is performed with the equipment plug being opened, a large amount of flux flows and then, the flow volume is stabilized to a minute value near zero. The return flow volume determination unit 33 determines whether or not the minute flow volume stabilized after a larger flow volume flows is equal to or larger than a predetermined value for each customer premise. When the minute flow volume is equal to or larger than the predetermined value, it is determined that there is possibility of leakage, and the return flow volume determination unit 33 does not determine that the return operation in which the gas is available is not completed, but continues to leakage determination.

After a predetermined minute flow volume is detected using the return flow volume determination unit 33, the leakage determination unit 29 determines, on the basis of the flow volume variation gradient, whether or not the gas flow volume obtained by detecting the flow velocity using the flow velocity detection unit 17 and converting it into the flow volume using the flow volume calculation unit 25 increases to a predetermined flow volume. The leakage determination unit 29 determines whether or not the flow volume variation gradient detected using the flow volume variation determination unit 34 has reached a leakage flow volume value within a predetermined time period. Although a large amount of flux flow so that the pressure in the pipe 1 becomes the same value as that of the upstream pressure, and the flow volume becomes a value near zero, when the plug is opened in the downstream, the flow volume does not become zero, but a minute flow volume near zero continues to flow. When the minute flow volume continues to stably flow for a predetermined time period, the flow volume starts to increase, and finally, an original flow volume measured when the equipment plug is opened flows. When the leakage estimation unit 35 determines that the flow volume increases to a predetermined flow volume value or greater than the flow volume variation gradient, it is determined that there is gas leakage, and the shutoff signal is output to the shutoff unit 27 again to stop supplying the gas. In other words, since it is determined whether or not the cause of the shutoff is removed by detecting whether or not there is a gas flow using the flow velocity detection unit 17 without erroneously determining that there is leakage even when the shutoff unit 27 is opened by driving it and a transient state in which the pipe is filled with the gas is detected, it is possible to determine whether or not there is leakage in a short time. When the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined using the flow velocity signal of the flow velocity detection unit 17 without depending on the variation of the flow volume in the pipe and without depending on the pipe length in each customer premise. Therefore, it is possible to determine whether or not the gas equipment can be used again in a short time. In addition, it is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff. Therefore, use convenience and safety can be improved.

Fifth Embodiment

Figure 5:
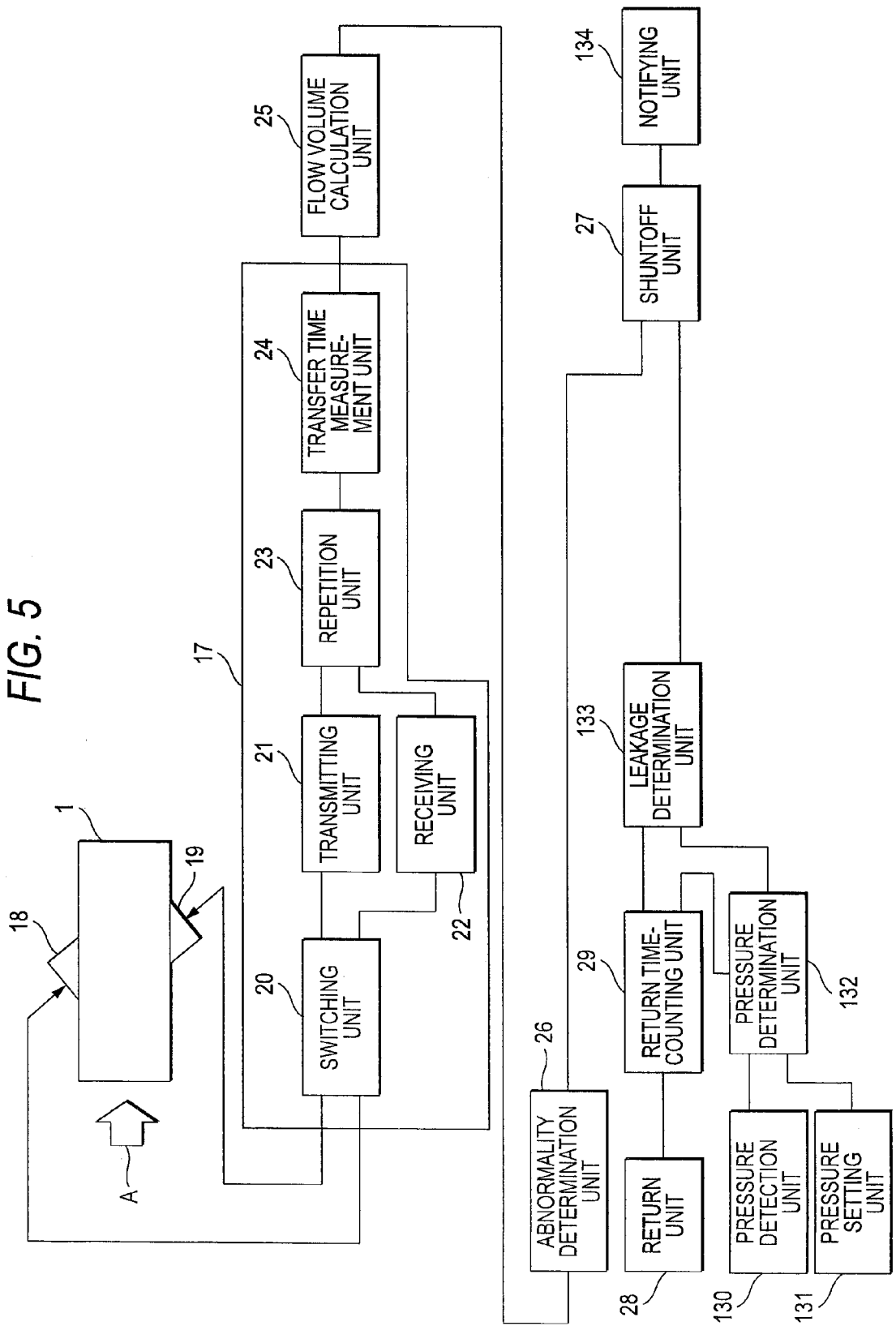
FIG. 5 is a control block diagram illustrating a gas shutoff apparatus according to the fifth embodiment of the present invention.

FIG. 5 illustrates a gas shutoff apparatus according to the fifth embodiment of the present invention. A reference numeral 17 denotes a flow velocity detection unit, which transmits an ultrasound signal between an upstream vibrator 18 and a downstream vibrator 19, oppositely installed in a fluid path 1 of a gas medium such as a city gas or an LPG and detects a flow velocity of the use gas on the basis of its transfer time. For example, the flow velocity detection unit 17 may be constructed as follows. Specifically, the flow velocity detection unit 17 comprises a switching return unit 20, a transmitting return unit 21, a receiving return unit 22, a repetition return unit 23, and a transfer time measurement return unit 24. The transmitting return unit 21 and the receiving return unit 22 are connected to the switching return unit 20. The switching return unit 20 alternately changes a connection destination between the transmitting return unit 21 and the receiving return unit 22, such that the transmitting return unit 21 and the receiving return unit 22 are connected to the upstream vibrator 18 and the downstream vibrator 19, respectively, and then, the transmitting return unit 21 and the receiving return unit 22 are connected to the downstream vibrator 19 and the upstream vibrator 18, respectively. The ultrasound signal transmitted from the transmitting return unit 21 passes from the upstream vibrator 18 through the fluid path, and then received from the downstream vibrator 19 to the receiving return unit 22 when the receiving return unit 22 is connected to the upstream vibrator 18 while the transmitting return unit 21 is connected to the downstream vibrator 19 using the switching return unit 20. The repetition return unit 23 repeatedly performs this transmission/receipt of the ultrasound signal, and repeatedly performs measurement of the signal transfer time using the transfer time measurement return unit 24 in the meanwhile. The transfer time measurement return unit 24 measures and accumulates the time taken from the transmission to the receipt of the ultrasound signal. Subsequently, the aforementioned operations are repeated by connecting the receiving return unit 22 and the transmitting return unit 21 to the downstream vibrator 19 and the upstream vibrator 18, respectively, using the switching return unit 20. The transfer time measurement return unit 24 obtains a transfer time difference between the transfer time obtained by initially receiving the ultrasound signal and the signal transfer time measured by switching the destination using the switching return unit 20.

A reference numeral 25 denotes a flow volume calculation unit, which obtains an amount of the using medium, i.e., a gas flow volume, by converting the obtained transfer time. A reference numeral 26 denotes an abnormality determination unit, which determines whether or not there is an abnormal use condition on the basis of the gas use amount obtained using the flow volume calculation unit 25. For example, in order to monitor whether or not there is an abnormal condition, the abnormal determination unit 26 stores a total flow volume shutoff value for detecting an abnormally large amount of flux generated when a hose supplying the gas to the use equipment such as a stove is removed due to some reasons or a use time shutoff table defining a limitation of the use time corresponding to the case where the equipment is used for a longer time than the maximum use time for which the equipment is typically used. A reference numeral 27 denotes a shutoff unit 27, which outputs a shutoff signal and shuts off a gas path 1 when the abnormality determination unit 26 determines that there is an abnormal condition. A reference numeral 28 denotes a return unit, which detects, using a switch or the like, a return instruction issued in order to open the fluid path that has been closed by the shutoff unit 27 due to the abnormal condition and make the gas medium available again and drives the shutoff unit 27 to open the fluid path. A reference numeral 29 denotes a return time-counting unit, which performs a time-counting after the operation of the return unit 28 and prohibits the flow volume detected using the flow velocity detection unit 17 and obtained using the flow volume calculation unit 25 in the meanwhile from being a target for determining leakage. A reference numeral 130 denotes a pressure detection unit, which detects the pressure in the pipe. A reference numeral 131 denotes a pressure setting return unit, which sets a pressure in the pipe for stopping use of the equipment, i.e., a blockage pressure. A reference numeral 132 denotes a pressure determination unit, which compares the pressure detected using the pressure detection unit 130 after the return with the pressure in the pressure setting return unit 131, and determines whether or not the pressure measured after the return operation is performed and then, the time of the return time-counting unit has been elapsed is equal to or larger than the blockage pressure. A reference numeral 133 denotes a leakage determination unit, which determines whether or not the pressure obtained by opening the shutoff unit 27 using the return unit 28, detecting a pressure using the pressure detection unit 130 after a predetermined time period has been elapsed by the return time-counting unit 29, and determining the pressure using the pressure determination unit 32 is equal to or larger than the blockage pressure, and determines that there is leakage if the pressure is not equal to or larger than the blockage pressure to output the shutoff signal to the shutoff unit 27. A reference numeral 134 denotes a notifying return unit, which displays contents or conditions of the shutoff operation as well as notifies a center of monitoring safety of the gas through a telephone line or the like when the abnormality determination unit 26 determines that there is an abnormal gas use condition and drives the shutoff unit 27.

Hereinafter, operations of the above construction will be described. After the gas shutoff apparatus is installed, the use condition of the gas equipment is monitored using the fluid amount detected using the flow volume detection return unit 17. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25 is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 5, a reference symbol A denotes a direction where the gas medium flows.

When the abnormality determination unit 26 determines that the obtained flow volume is abnormal, the shutoff signal is output to the shutoff unit 27. Accordingly, the shutoff unit 27 is driven, and the fluid path 1 is closed to stop supplying the gas. In addition, when the shutoff signal is output, the content of the shutoff is displayed on the notifying return unit 134. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, and when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the pressure detection unit 130 becomes zero or a value near zero. However, when the return unit 28 is operated to open the shutoff unit 27 without removing the cause of the shutoff for some reasons, a large amount of flux flows, and the gas pressure in the pipe increases to nearly the blockage pressure. However, since the gas equipment plug located in the downstream of the pipe 1 is opened, the flow volume gradually increases and returns to a pressure, (i.e., a control pressure) measured during use of the equipment just before the shutoff although the gas is fully filled. The flow volume or the pressure detected by the flow velocity detection unit 17 or the pressure detection unit 130 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed. The leakage determination unit 133 determines a determination signal on whether or not there is a predetermined pressure by detecting a pressure after a predetermined time period has been elapsed by the return time-counting unit 29 using the pressure detection unit 17 and comparing the detected pressure with the setup pressure of the pressure setting return unit 131 using the pressure determination unit 132. The pressure setting return unit 131 has a blockage pressure for stopping the equipment. The leakage determination unit 33 determines that there is gas leakage when the pressure which is equal to or lower than the blockage pressure is detected, and output the shutoff signal to the shutoff unit 27 to stop supplying the gas. In other words, since it is determined whether or not the cause of the shutoff is removed by detecting whether or not the gas pressure is slightly reduced below the blockage pressure, which is not regarded as a pressure reduction and also does not equal to the blockage pressure, using the pressure detection unit 130 without erroneously determining that there is leakage even when the shutoff unit 27 is opened by driving it and a transient state in which the pipe is filled with the gas is detected, it is possible to determine whether or not there is leakage in a short time. If the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined on the basis of the pressure signal of the pressure detection unit 130 without depending on the variation of the flow volume in the pipe. Therefore, it is possible to determine whether or not the gas equipment can be used again in a short time. In addition, it is possible to prevent a problem that the leakage continues because it is not regarded as a gas reduction condition and the shutoff operation is not performed even when there is minute gas leakage. Therefore, It is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff without erroneously determining the pressure during the gas is filled in the pipe (i.e., a control pressure) as leakage. Therefore, use convenience and safety can be improved.

Sixth Embodiment

Figure 6:
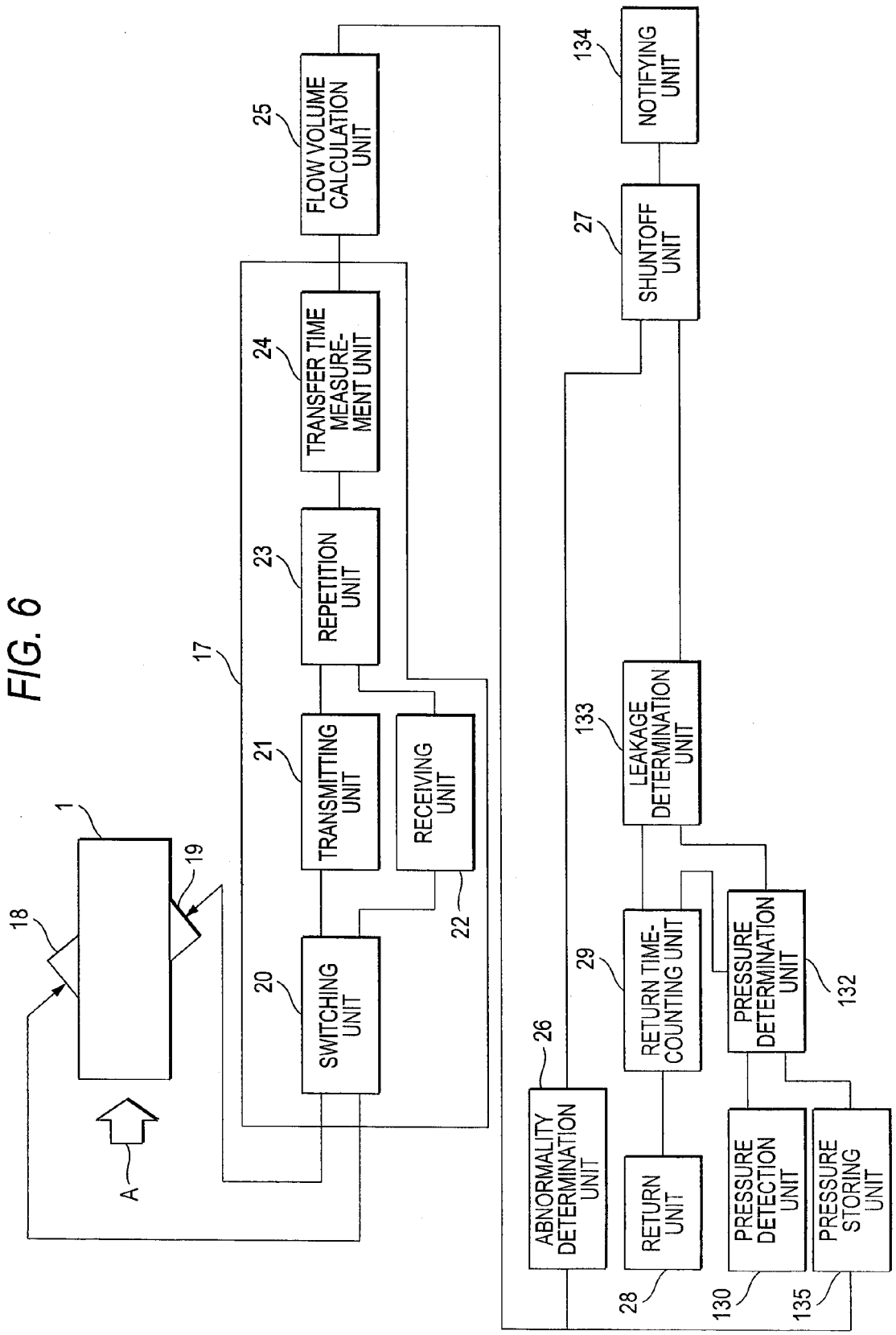
FIG. 6 is a control block diagram illustrating a gas shutoff apparatus according to the sixth embodiment of the present invention.

FIG. 6 illustrates a gas shutoff apparatus according to the sixth embodiment of the present invention. In FIG. 6, like reference numerals denotes like elements having the same functions as those of FIGS. 5, 7, 8, and 9, and their descriptions are omitted.

In FIG. 6, a reference numeral 35 denotes a pressure storing unit, which detects a pressure (i.e., a control pressure) detected by the pressure detection unit 130 during the equipment is in use (i.e., when the flow volume detected by the flow velocity detection unit 17 is not near zero, an equipment flow volume is detected) and stores its maximum value. Although not shown in the drawing, the maximum value is periodically cleared, detected and then, stored again.

Subsequently, operations of the above construction will be described. After the gas shutoff apparatus is installed, the use condition of the gas equipment is monitored using the flow volume detected by the flow velocity detection unit 27. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25 is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 5, a reference symbol A denotes a direction where the gas medium flows. In addition, when the equipment flow volume is detected using the flow velocity detection unit 17, the pressure detection unit 130 detects a supply pressure (i.e., a control pressure) and store its maximum value in the pressure storing unit 135. The pressure storing unit 135 stores a history of the maximum supply pressures.

When the abnormality determination unit 26 determines that the obtained flow volume is abnormal, the shutoff signal is output to the shutoff unit 27. Accordingly, the shutoff unit 27 is driven, and the fluid path 1 is closed to stop supplying the gas. In addition, when the shutoff signal is output, the content of the shutoff is displayed on the notifying return unit 134. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, or when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the flow velocity detection unit 17 becomes nearly a blockage pressure, i.e., a pressure value measured when the equipment stops. However, when the return unit 28 is operated to open the shutoff unit 27 without removing the cause of the shutoff for some reasons, a large amount of flux flows, and the gas pressure in the pipe increases to nearly a blockage pressure. However, since the gas equipment plug located in the downstream of the pipe 1 is opened, the flow volume gradually increases and returns to the gas supply condition (i.e., a control pressure) measured during the equipment is in use just before the shutoff although the gas is fully filled. The flow volume or the pressure detected by the flow velocity detection unit 17 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed. The pressure determination unit 132 compares the pressure detected using the pressure detection unit 17 after a predetermined time period has been elapsed by the return time-counting unit 29 with the maximum value of the control pressure stored in the pressure storing unit 135. The leakage determination unit 133 determines a determination signal on whether or not a pressure detected using a value obtained by adding a predetermined pressure to the maximum control pressure is high. Since the pressure storing unit 135 stores a supply pressure measured during the equipment is used for a predetermined time period, i.e., the maximum value of the control pressure, it is possible to certainly recognize the pressure measured during the equipment is in use. The leakage determination unit 133 determines that there is gas leakage when the pressure is equal to or lower than the stored maximum control pressure, and outputs the shutoff signal to the shutoff unit 27 to stop supplying the gas. In other words, since it is determined whether or not the cause of the shutoff is removed by detecting whether or not the gas pressure is slightly reduced to the blockage pressure or lower, which is not regarded as a pressure reduction and also does not equal to the blockage pressure, using the pressure detection unit 130 without erroneously determining that there is leakage even when the shutoff unit 27 is opened by driving it and a transient state in which the pipe is filled with the gas is detected, it is possible to determine whether or not there is leakage in a short time. If the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined on the basis of the pressure signal of the pressure detection unit 130 without depending on the variation of the flow volume in the pipe. Therefore, it is possible to determine whether or not the gas equipment can be used again in a short time. In addition, it is possible to prevent a problem that the leakage continues because it is not regarded as a gas reduction condition and the shutoff operation is not performed even when there is minute gas leakage. Therefore, It is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff without erroneously determining the pressure during the gas is filled in the pipe (i.e., a control pressure) as leakage. Therefore, use convenience and safety can be improved.

Seventh Embodiment

Figure 7:
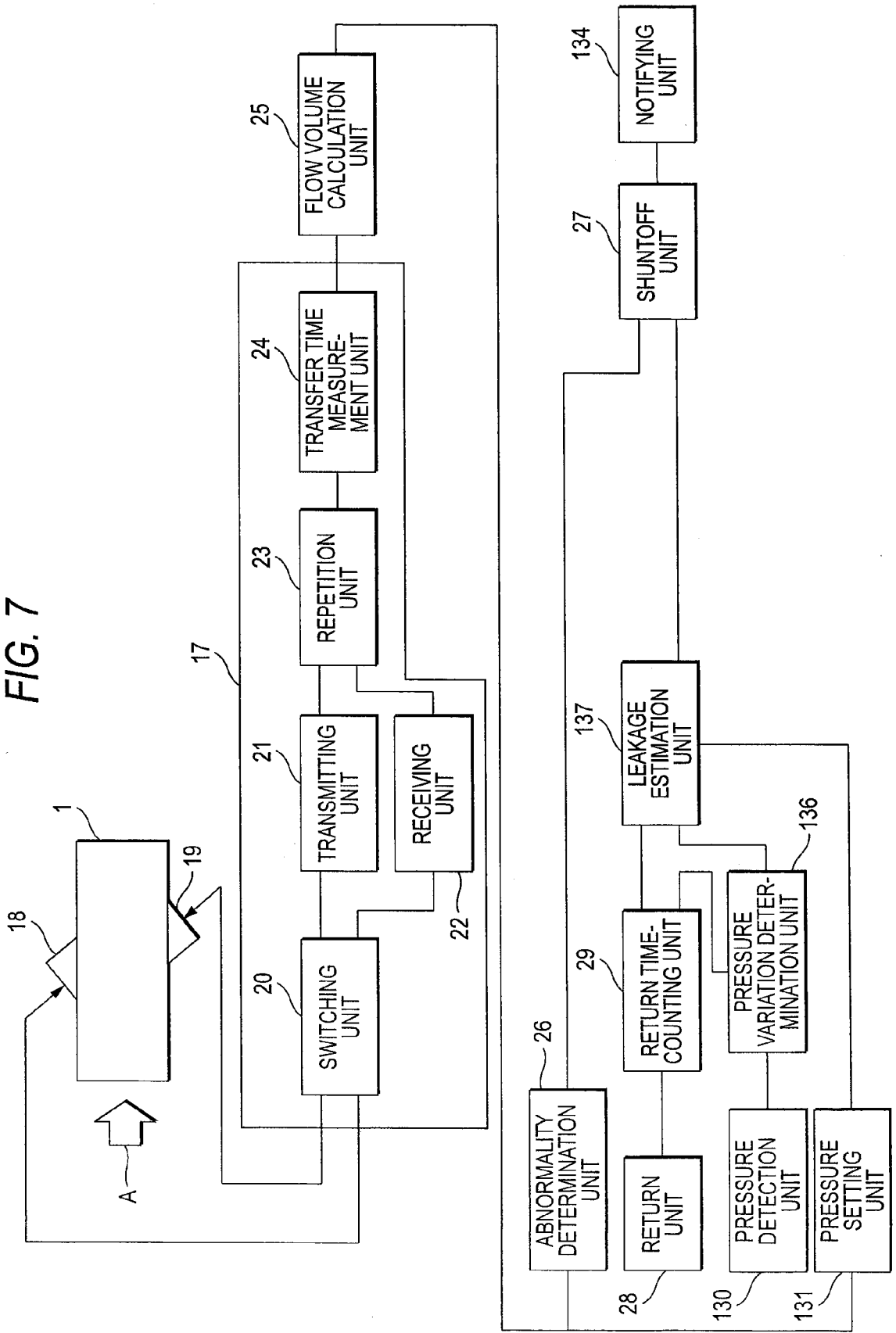
FIG. 7 is a control block diagram illustrating a gas shutoff apparatus according to the seventh embodiment of the present invention.

FIG. 7 illustrates a gas shutoff apparatus according to the seventh embodiment of the present invention. In FIG. 7, like reference numerals denotes like elements having the same functions as those of FIGS. 5, 6, 8, and 9, and their descriptions are omitted.

In FIG. 7, a reference numeral 136 denotes a pressure variation determination unit, which obtains a pressure variation gradient on the basis of the pressure detected by the pressure detection unit 130, and determines whether or not the pressure is reduced from the blockage pressure to the control pressure. A reference numeral 137 denotes a leakage estimation unit, which detects a negative pressure variation gradient using the pressure variation determination unit 136, and estimates whether or not the pressure corresponding to the variation gradient is below the blockage pressure that has been set by the pressure setting return unit 131. The shutoff signal is output when it is estimated that the pressure corresponding to the variation gradient is reduced below the blockage pressure.

Subsequently, operations of the above construction will be described. After the gas shutoff apparatus is installed, the use condition of the gas equipment is monitored using the flow volume detected by the flow velocity detection unit 27. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25 is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 5, a reference symbol A denotes a direction where the gas medium flows.

When the abnormality determination unit 26 determines that the obtained flow volume is abnormal, the shutoff signal is output to the shutoff unit 27. Accordingly, the shutoff unit 27 is driven, and the fluid path 1 is closed to stop supplying the gas. In addition, when the shutoff signal is output, the content of the shutoff is displayed on the notifying return unit 134. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, or when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the flow velocity detection unit 17 becomes nearly a blockage pressure, i.e., a pressure value measured when the equipment stops. However, when the return unit 28 is directly operated to open the shutoff unit 27 without removing the cause of the shutoff for some reasons, a large amount of flux flows, and the gas pressure in the pipe increases to nearly a blockage pressure. However, since the gas equipment plug located in the downstream of the pipe 1 is opened, the flow volume gradually increases and returns to the gas supply condition (i.e., a control pressure) measured during the equipment is used just before the shutoff although the gas is fully filled. The flow volume or the pressure detected by the flow velocity detection unit 17 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed. The pressure detection unit 17 detects a pressure changed after a predetermined time period has been elapsed by the return time-counting unit 29, and the pressure variation determination unit 136 obtains a pressure variation gradient. If there is leakage, the pressure value has a tendency to be reduced from the blockage pressure to the control pressure. The pressure setting return unit 131 sets the blockage pressure of a time point when the equipment stops. If the pressure variation gradient and the variation value are detected, the leakage determination unit 133 estimates the reduction value of the pressure. If it is estimated that the pressure is reduced to the blockage pressure or lower after a predetermined time period has been elapsed, it is determined that there is gas leakage, and the shutoff signal is output to the shutoff unit 27 again to stop supplying the gas. In other words, since it is determined whether or not the cause of the shutoff is removed by detecting whether or not the gas pressure is slightly reduced to the blockage pressure or lower, which is not regarded as a pressure reduction and also does not equal to the blockage pressure, using the pressure detection unit 130 without erroneously determining that there is leakage even when the shutoff unit 27 is opened by driving it and a transient state in which the pipe is filled with the gas is detected, it is possible to determine whether or not there is leakage in a short time. If the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined on the basis of the pressure signal of the pressure detection unit 130 without depending on the variation of the flow volume in the pipe. Therefore, it is possible to determine whether or not the gas equipment can be used again in a short time. In addition, it is possible to prevent a problem that the leakage continues because it is not regarded as a gas reduction condition and the shutoff operation is not performed even when there is minute gas leakage. Therefore, it is possible to identify, in a short time, removal of the cause of the shutoff or whether or not the original cork of the gas equipment is perfectly closed, when the erroneous determination is performed due to an abnormally large flow volume, a total flow volume shutoff, or a use time shutoff without erroneously determining the pressure during the gas is filled in the pipe (i.e., a control pressure) as leakage. Therefore, use convenience and safety can be improved.

Eighth Embodiment

Figure 8:
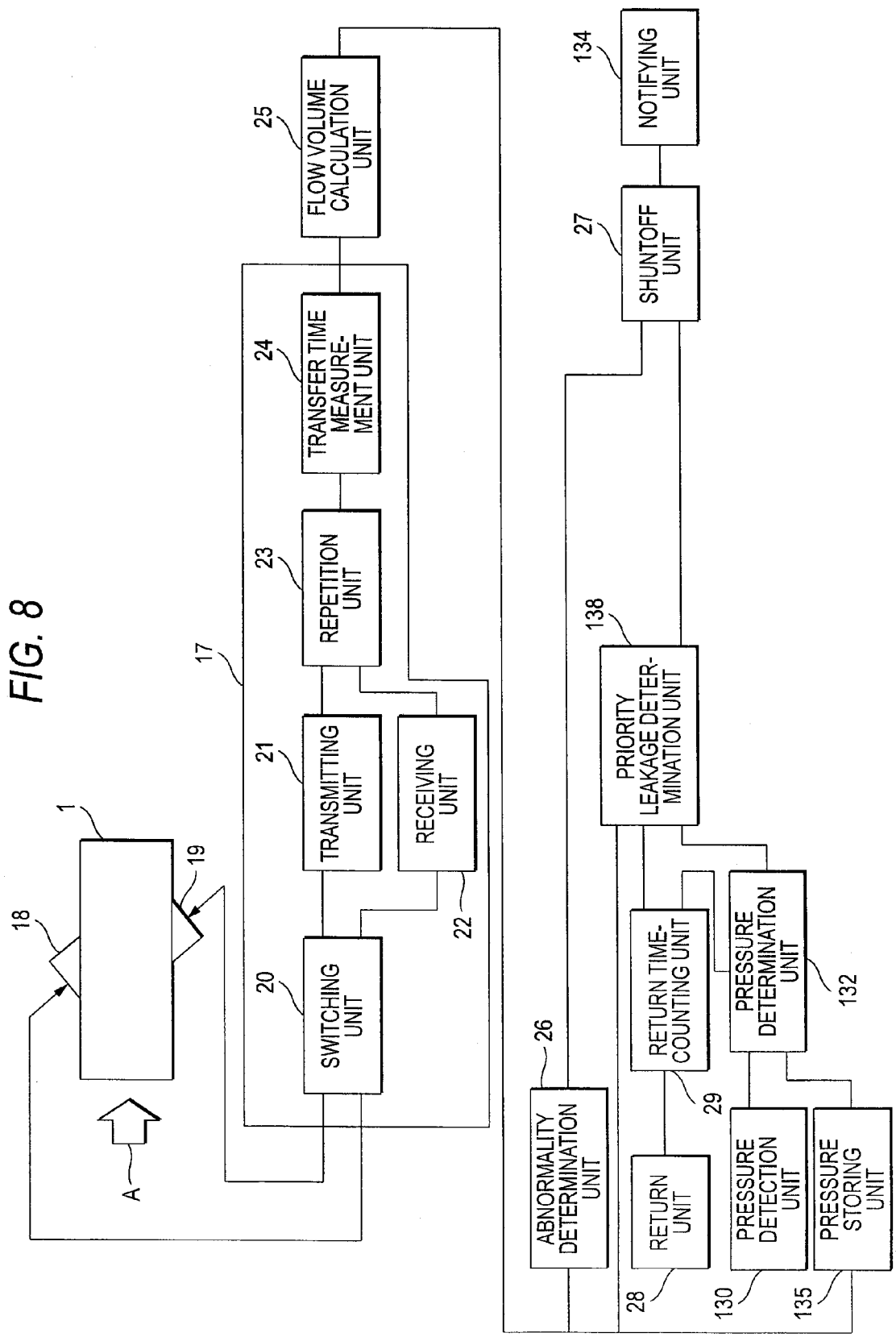
FIG. 8 is a control block diagram illustrating a gas shutoff apparatus according to the eighth embodiment of the present invention.
Figure 9:
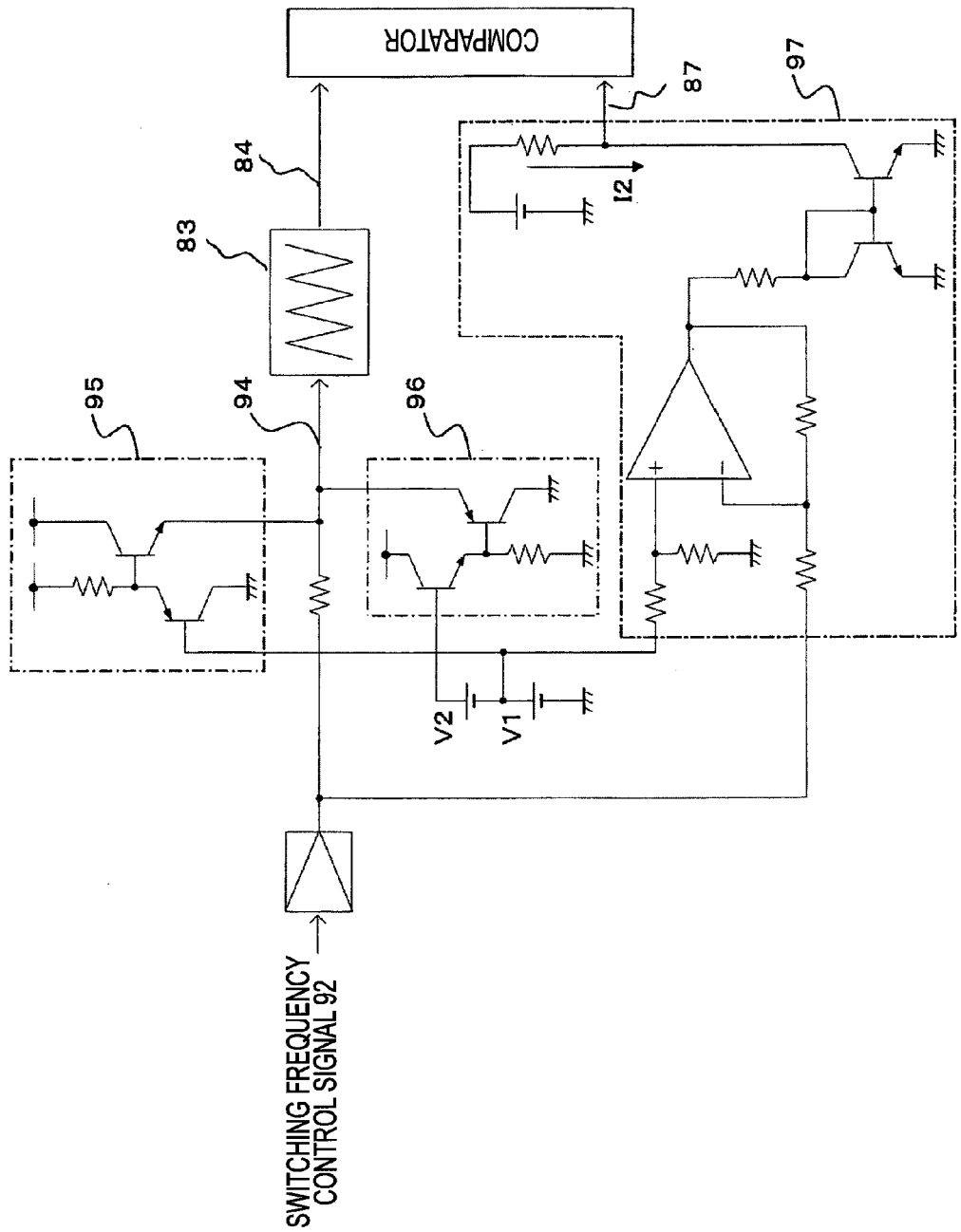
FIG. 9 is a control block diagram illustrating a conventional gas shutoff apparatus.

FIG. 8 illustrates a gas shutoff apparatus according to the seventh embodiment of the present invention. In FIG. 8, like reference numerals denotes like elements having the same functions as those of FIGS. 5, 6, 7, and 9, and their descriptions are omitted.

In FIG. 8, a reference numeral 138 denotes a leakage determination unit. After the shutoff unit 27 is recovered on the basis of the return unit 28, and a predetermined time period has been elapsed by the return time-counting unit 29, it is determined whether or not the flow volume signal from the flow velocity detection unit 17 is equal to or larger than a predetermined value, or the pressure detected by the pressure detection unit 130 is compared with the blockage pressure setup value of the pressure setting return unit 131. One of the signals determined that they are lower is selected as a leakage determination signal, and a shutoff signal is output to the shutoff unit 27, so that it is determined that it is not the gas supply state.

Subsequently, operations of the above construction will be described. After the gas shutoff apparatus is installed, the use condition of the gas equipment is monitored using the flow volume detected by the flow velocity detection unit 27. The supply of the gas is shutoff due to an abnormal use condition of the gas equipment when the gas equipment such as a gas stove or a boiler is abnormally used in houses of customer premises for a long time or when the gas hose is removed for some reasons and the gas abnormally leaks. The abnormality determination unit 26 determines whether or not the use gas amount is within a normal flow volume range by determining whether or not the transfer time detected using the flow velocity detection unit 17, i.e., the flow volume value converted from the flow velocity value using the flow volume calculation unit 25 is abnormally long, or is an abnormally larger flow volume value than a predefined value. Now, exemplary operations of the flow velocity detection unit 17 will be described.

An ultrasound signal is transmitted and received between the upstream vibrator 18 and the downstream vibrator 19 obliquely installed in the fluid path 1 (i.e., a gas pipe). The transmitting return unit 21 is connected to the upstream vibrator 18, and the receiving return unit 22 is connected to the downstream vibrator 19 using the switching return unit 20 to receive the signal transmitted from the transmitting return unit 21 from the upstream vibrator 18 through the downstream vibrator 19. This operation is performed predetermined times set by the repetition return unit 23, to constitute, so called, a sing-around system. The transfer time measurement return unit 24 obtains the transfer time taken until the receiving return unit 22 receives the ultrasound signal transmitted from the transmitting return unit 21 by accumulating it.

Subsequently, using the switching return unit 20, the transmitting return unit 21 is connected to the downstream vibrator 19, and the receiving return unit 22 is connected to the upstream vibrator 18. The ultrasound signal is output from the transmitting return unit 21, and received by the receiving return unit 22 connected to the upstream vibrator 18 through the downstream vibrator 19 and the fluid path 1. Similar to the above description, this operation is performed as much as times set by the repetition return unit 23. The transfer time measurement return unit 24 obtains the transfer time taken until the receiving return unit 22 receives the ultrasound signal transmitted from the transmitting return unit 21 by accumulating it, and obtains a transfer time difference between the transfer time taken when the ultrasound signal is transmitted from the upstream to the downstream and the transfer time transmitted from the downstream to the upstream. Then, the flow volume calculation unit 25 converts the transfer time obtained by the transfer time measurement return unit 19, i.e., the flow velocity value V, into a flow volume value Q. In FIG. 5, a reference symbol A denotes a direction where the gas medium flows. In addition, when the equipment flow volume is detected using the flow velocity detection unit 17, the pressure detection unit 130 detects a supply pressure (i.e., a control pressure) and store its maximum value in the pressure storing unit 135. The pressure storing unit 135 stores a history of the maximum supply pressures.

When the abnormality determination unit 26 determines that the obtained flow volume is abnormal, the shutoff signal is output to the shutoff unit 27. Accordingly, the shutoff unit 27 is driven, and the fluid path 1 is closed to stop supplying the gas. In addition, when the shutoff signal is output, the content of the shutoff is displayed on the notifying return unit 134. When the cause of the shutoff is removed, for example, when the hose erroneously installed is reinstalled, the return unit 28 is operated, and the shutoff unit 27 is driven, to open the fluid path. Then, it is identified whether or not a gas equipment user or a gas provider perfectly removes the cause of the shutoff by referencing the flow volume. When the gas is shutoff due to an abnormally large amount of flux (i.e., a total flow volume shutoff), when the erroneously installed gas hose is corrected, or when the gas is shutoff due to a long time use of the gas equipment such as a stove (i.e., a use time shutoff), the gas remaining in the pipe until the cause of the shutoff is removed, for example, until a cork of the gas equipment is closed is spontaneously discharged. Just after the plug is opened, there is a pressure difference in the downstream of the shutoff valve. Therefore, a large amount of flux flows until the gas pressure in the downstream pipe which has been reduced reaches a supply pressure. When the pressure becomes uniform after that, the flow velocity value detected by the flow velocity detection unit 17 becomes nearly a blockage pressure, i.e., a pressure value measured when the equipment stops. However, when the return unit 28 is directly operated to open the shutoff unit 27 without removing the cause of the shutoff for some reasons, a large amount of flux flows, and the gas pressure in the pipe increases to nearly a blockage pressure. However, since the gas equipment plug located in the downstream of the pipe 1 is opened, the flow volume gradually increases and returns to the gas supply condition (i.e., a control pressure) measured during the equipment is in use just before the shutoff although the gas is fully filled. The flow volume or the pressure detected by the flow velocity detection unit 17 until a predetermined time period has been elapsed using the return time-counting unit 29 after the shutoff unit 27 is opened by the return unit 28 is not selected as a target of the leakage determination, but the leakage determination is performed using the flow volume measured after a predetermined time period has been elapsed or the earliest one of the flow volume signals having a predetermined flow volume or greater. The pressure detection unit 17 detects a pressure changed after a predetermined time period has been elapsed by the return time-counting unit 29, and the pressure determination unit 132 compares it with the maximum value of the control pressure stored in the pressure storing unit 135. The leakage determination unit 133 determines a determination signal on whether or not a pressure detected using a value obtained by adding a predetermined pressure to the maximum control pressure is high. Since the pressure storing unit 135 stores a supply pressure measured during the equipment is in use for a predetermined time period, i.e., the maximum value of the control pressure, it is possible to certainly recognize the pressure during the equipment is in use. On the other hand, the flow volume is detected using the flow volume detection return unit 17, and the leakage flow volume value gradually increase to a predetermined flow volume. The priority leakage determination unit 138 determines that there is gas leakage when the pressure is equal to or lower than the stored maximum control pressure, or the earliest one of the signals having a flow volume equal to or larger than a predetermined flow volume, and outputs the shutoff signal to the shutoff unit 27 to stop supplying the gas. In other words, since it is determined whether or not the cause of the shutoff is removed by detecting whether or not the gas pressure is slightly reduced to the blockage pressure or lower, which is not regarded as a pressure reduction and also does not equal to the blockage pressure, using the pressure detection unit 130, or by detecting the earliest one of the signals having the flow volume which gradually increase when the equipment plug is not closed after the pipe is filled with gases, without erroneously determining that there is leakage even when the shutoff unit 27 is opened by driving it and a transient state in which the pipe is filled with the gas is detected, it is possible to determine whether or not there is leakage in a short time. If the detected condition is normal, i.e., when the gas flow volume is not detected, it is determined that the cause of the shutoff is removed, and the fluid path 1 is opened, so that the gas equipment is recovered to a normal use condition.

As a result, whether or not there is gas leakage after an abnormal condition is detected during the use of the gas equipment and the shutoff unit 27 is recovered using the return unit 28 is determined on the basis of the pressure signal of the pressure detection unit 130 without depending on the variation of the flow volume in the pipe. Therefore, it is possible to determine whether or not the gas equipment can be used again in a short time. In addition, it is possible to prevent a problem that the leakage continues because it is not regarded as a gas reduction condition and the shutoff operation is not performed even when there is minute gas leakage. Therefore, it is possible to identify, in a short time, removal of the cause of the shutoff or whether or not the original cork of the gas equipment is perfectly closed, when a total flow volume shutoff or a use time shutoff is performed without erroneously determining the pressure during the gas is filled in the pipe (i.e., a control pressure) as leakage. Since the leakage determination is performed using the pressure detection unit 130 as well as the flow velocity detection unit 17, usability, safety, and reliability can be improved.

INDUSTRIAL APPLICABILITY

As described above, the gas shutoff apparatus according to the present invention can be applied to measurement of various gases such as an LP gas, a city gas, and a hydrogen gas flowing through a pipe using sensors such a film type, an ultrasound type, a thermal type, and a fluidic sensor, and also applied to a water-supply metering for measuring liquid such as water using an ultrasound sensor or the like.

While the present invention has been described with reference to the accompanying drawings, it would be apparent to those skilled in the art that various modifications or changes can be made without departing from the scope and spirit of the present invention.

The present invention claims profits of the priorities of Japanese Patent Application No. 2004-302336, filed on Oct. 20, 2004, and Japanese Patent Application No. 2004-302337, filed on Oct. 20, 2004, of which entirety is incorporated as reference herein.

The invention claimed is:

1. A gas shutoff apparatus, comprising:
   a flow velocity detection unit which detects a flow velocity by measuring a signal transfer time in a medium;
   a flow volume calculation unit which converts the flow velocity detected by the flow velocity detection unit into a flow volume;
   an abnormality determination unit which determines whether or not a use flow volume calculated by the flow volume calculation unit is normal;
   a shutoff unit which shuts off a fluid path through which the medium flows when the abnormality determination unit determines that there is abnormality;
   a return unit which outputs a return signal to the shutoff unit to open the fluid path;
   a return time-counting unit which starts a time-counting on the basis of a return operation of the return unit; and
   a leakage determination unit which defers performing a leakage determination based on a flow volume detected by the flow volume calculation unit until after the return time-counting unit counts that a predetermined time period has been elapsed from a time of starting the return operation of the return unit.

2. The gas shutoff apparatus according to claim 1, further comprising a return determination unit which determines whether or not the detected flow volume from the flow volume calculation unit after the return is within a predetermined flow volume and changes the predetermined time period to be counted by the return time-counting unit.

3. The gas shutoff apparatus according to claim 1, wherein the predetermined time period counted by the return time-counting unit is set based on a pipe length of a gas pipe between the shutoff unit and a gas equipment arranged downstream of the shutoff unit.

4. The gas shutoff apparatus according to claim 1, further comprising:
   a predetermined time period setting unit that sets the predetermined time period to be counted by the return time-counting unit.

5. A gas shutoff method, comprising:
   a flow velocity detection process for detecting a flow velocity by measuring a signal transfer time in a medium;
   a flow volume calculation process for converting the flow velocity detected in the flow velocity detection process into a flow volume;
   an abnormality determination process for determining whether or not a use flow volume calculated in the flow volume calculation process is normal;
   a shutoff process for shutting off a fluid path through which the medium flows when it is determined in the abnormality determination process that there is abnormality;
   a return process for outputting a return signal to open the fluid path;
   a return time-counting process for starting a time-counting on the basis of the return signal; and
   a leakage determination process for deferring performing a leakage determination based on a flow volume detected by the flow volume calculation process until after a predetermined time period has been elapsed from the start of the time-counting.

6. The gas shutoff method according to claim 5, further comprising:
   a flow volume determination process for determining whether or not the flow volume measured in the flow volume calculation process after the return is within a predetermined flow volume; and
   a return determination process for changing a setting of the predetermined time period counted in the return time-counting process.

7. The gas shutoff method according to claim 5, wherein the predetermined time period counted in the return time-counting process is set based on a pipe length of a gas pipe between a shutoff unit and a gas equipment arranged downstream of the shutoff unit.

8. The gas shutoff method according to claim 5, further comprising:
   a predetermined time period setting process for setting the predetermined time period to be counted in the return time-counting process.

* * * * *